United States Patent
Melsheimer

(10) Patent No.: US 10,197,338 B2
(45) Date of Patent: Feb. 5, 2019

(54) BUILDING SYSTEM FOR CASCADING FLOWS OF MATTER AND ENERGY

(71) Applicant: Kevin Hans Melsheimer, Point Roberts, WA (US)

(72) Inventor: Kevin Hans Melsheimer, Point Roberts, WA (US)

( * ) Notice: Subject to any disclaimer, the term of this patent is extended or adjusted under 35 U.S.C. 154(b) by 913 days.

(21) Appl. No.: 13/974,038

(22) Filed: Aug. 22, 2013

(65) Prior Publication Data

US 2015/0053366 A1 Feb. 26, 2015

(51) Int. Cl.
*F28D 20/00* (2006.01)
*B01D 53/047* (2006.01)

(52) U.S. Cl.
CPC .......... *F28D 20/00* (2013.01); *B01D 53/047* (2013.01); *B01D 2253/108* (2013.01); *B01D 2257/302* (2013.01); *B01D 2257/404* (2013.01); *B01D 2257/708* (2013.01); *B01D 2259/65* (2013.01); *Y02E 60/142* (2013.01); *Y02W 10/33* (2015.05); *Y02W 10/37* (2015.05)

(58) Field of Classification Search
CPC ....... A01G 31/02; Y02E 10/40; Y02E 60/142; Y02W 30/43; F28D 20/00; B01D 53/047; B01D 2259/65; B01D 2257/302; B01D 2257/404; B01D 2257/708; B01D 2253/108

See application file for complete search history.

(56) References Cited

U.S. PATENT DOCUMENTS

| | | | |
|---|---|---|---|
| 4,077,158 A | 3/1978 | England | |
| 4,122,800 A | 10/1978 | Mangarell | |
| 4,127,453 A * | 11/1978 | Radebold | F24J 2/125 205/339 |
| 4,139,321 A | 2/1979 | Werner | |
| 4,195,441 A | 4/1980 | Baldwin | |
| 4,299,277 A | 11/1981 | McGregor | |
| 4,373,573 A | 2/1983 | Madwed | |
| 4,398,529 A | 8/1983 | Schoenfelder | |
| 4,452,229 A | 6/1984 | Powers | |
| 4,484,617 A * | 11/1984 | Sizmann | F28D 20/003 165/104.12 |
| 4,523,629 A | 6/1985 | Copeland | |
| 4,531,374 A * | 7/1985 | Alefeld | F01K 17/005 62/101 |
| 4,552,205 A | 11/1985 | Saunders | |
| 4,677,903 A | 7/1987 | Mathews, III | |
| 4,780,989 A | 11/1988 | Mears | |
| 5,046,451 A | 9/1991 | Inslee | |
| 5,121,708 A | 6/1992 | Nuttle | |
| 5,322,035 A | 6/1994 | Hawes | |
| 5,377,458 A | 1/1995 | Dempster | |
| 5,524,381 A | 6/1996 | Chahroudi | |

(Continued)

FOREIGN PATENT DOCUMENTS

| | | |
|---|---|---|
| DE | 10106226 A1 | 8/2002 |
| EP | 1553069 A2 | 7/2005 |

(Continued)

*Primary Examiner* — Michael C Zarroli

(57) ABSTRACT

An engineered ecosystem, moderating eight primary systems—thermal management, atmospheric optimization, radiation controls, hydrological systems, energy systems, material flows, systems management, and built systems—to provide homeostatic regulation of cascading flows of matter and energy.

70 Claims, 11 Drawing Sheets

Front View

Enclosed Court View

(56) References Cited

U.S. PATENT DOCUMENTS

| | | |
|---|---|---|
| 5,603,189 A | 2/1997 | Levy |
| 5,707,416 A | 1/1998 | Sudrabin |
| 5,813,168 A | 9/1998 | Clendening |
| 5,865,141 A | 2/1999 | Poynter |
| 6,182,408 B1 | 2/2001 | Poehler |
| 6,470,679 B1 * | 10/2002 | Ertle .................. F02G 1/02 60/512 |
| 6,574,979 B2 | 6/2003 | Faqih |
| 6,994,156 B2 | 2/2006 | Kopko |
| 7,597,629 B2 | 10/2009 | Laijoki-Puska |
| 7,905,049 B2 | 3/2011 | Erd |
| 7,997,079 B2 | 8/2011 | Seidel |
| 8,047,905 B2 | 11/2011 | Everett |
| 8,103,601 B2 | 1/2012 | Hnatio |
| 8,539,763 B2 * | 9/2013 | McBride .............. F01B 23/00 60/509 |
| 2006/0137349 A1 * | 6/2006 | Pflanz .................. F03G 6/06 60/641.2 |
| 2007/0187323 A1 | 8/2007 | Williams |
| 2007/0295489 A1 | 12/2007 | Tay |
| 2008/0000151 A1 | 1/2008 | Houweling |
| 2008/0264128 A1 | 10/2008 | Morrison |
| 2009/0282840 A1 * | 11/2009 | Chen .................. F01D 15/005 62/50.3 |
| 2011/0023361 A1 | 2/2011 | Storey |
| 2012/0232701 A1 * | 9/2012 | Carty .................. G05B 15/02 700/277 |
| 2012/0323382 A1 * | 12/2012 | Kamel .................. G05F 1/66 700/286 |
| 2014/0183957 A1 * | 7/2014 | Duchesneau ........ F01K 13/006 307/64 |
| 2015/0260463 A1 * | 9/2015 | Laughlin ................ F02C 1/10 165/10 |

FOREIGN PATENT DOCUMENTS

| | | |
|---|---|---|
| EP | 1945133 A2 | 7/2008 |
| EP | 2103583 A1 | 9/2009 |
| EP | 2099988 B1 | 7/2012 |
| WO | WO 2003006400 A1 | 1/2003 |
| WO | WO2003006400 A1 | 1/2003 |

* cited by examiner

Pressure Swing Adsorption

Temperature Gradient Heat Exchanger

Temperature Gradient Heat Exchanger

Microbial Air Filtration

Waste Streams

Biochemical Processing

Thermochemical Processing

Consumer & Producer with Thermal Reservoir

Temperature Gradient for Prime Mover

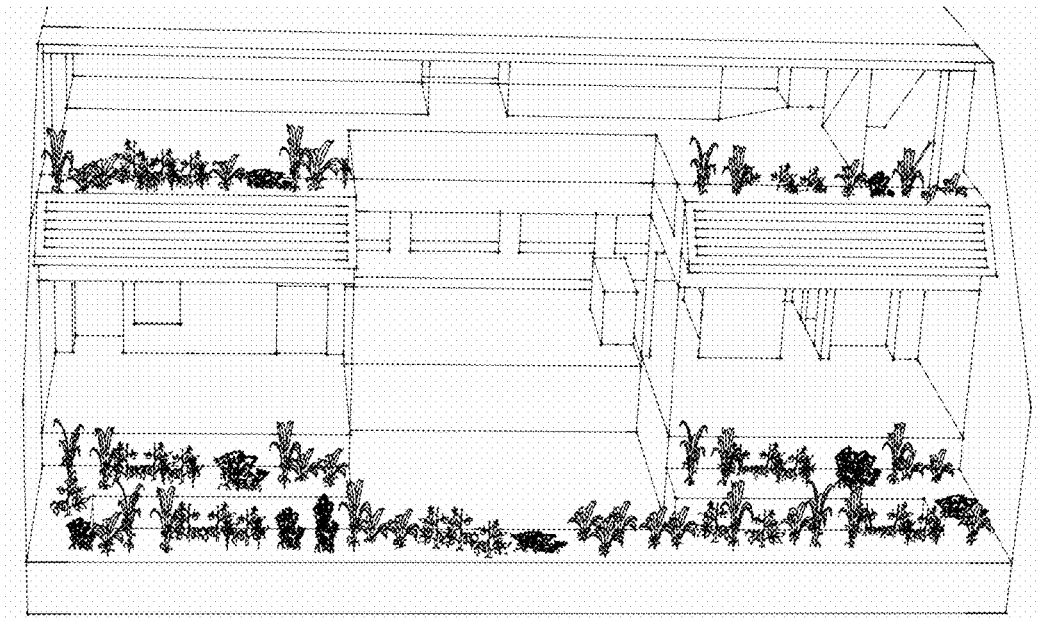
Figure 10  Front View
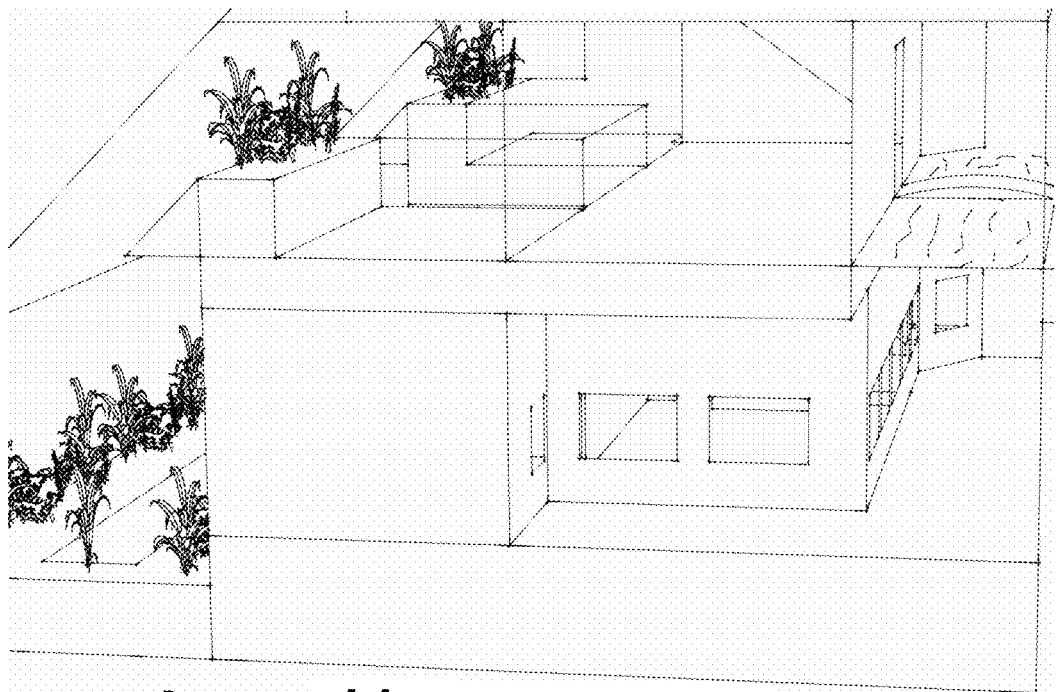
Figure 11  Side View

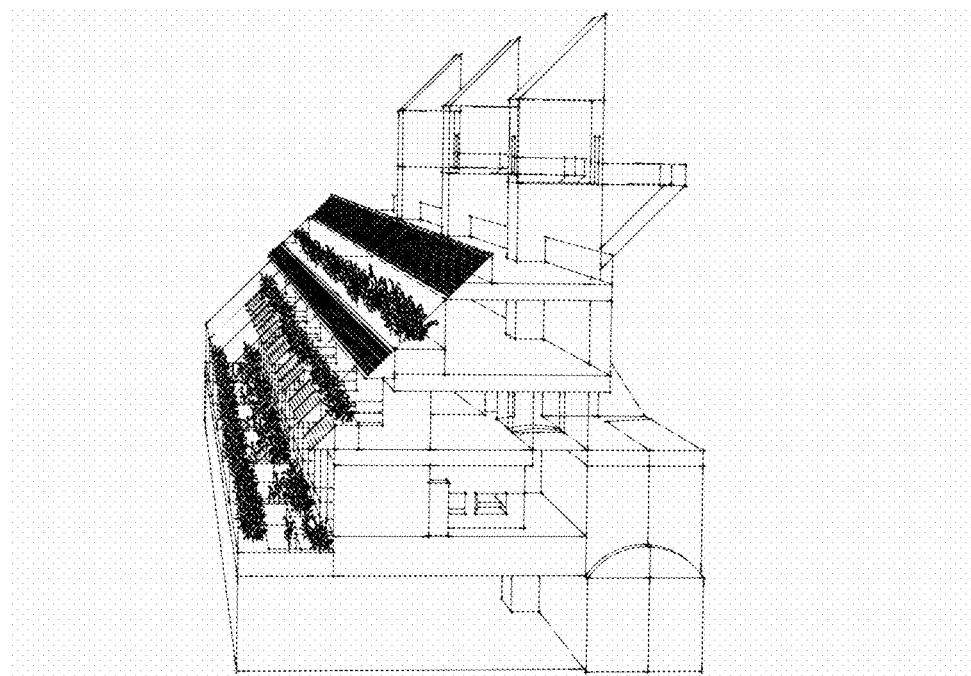
Figure 12 Side View
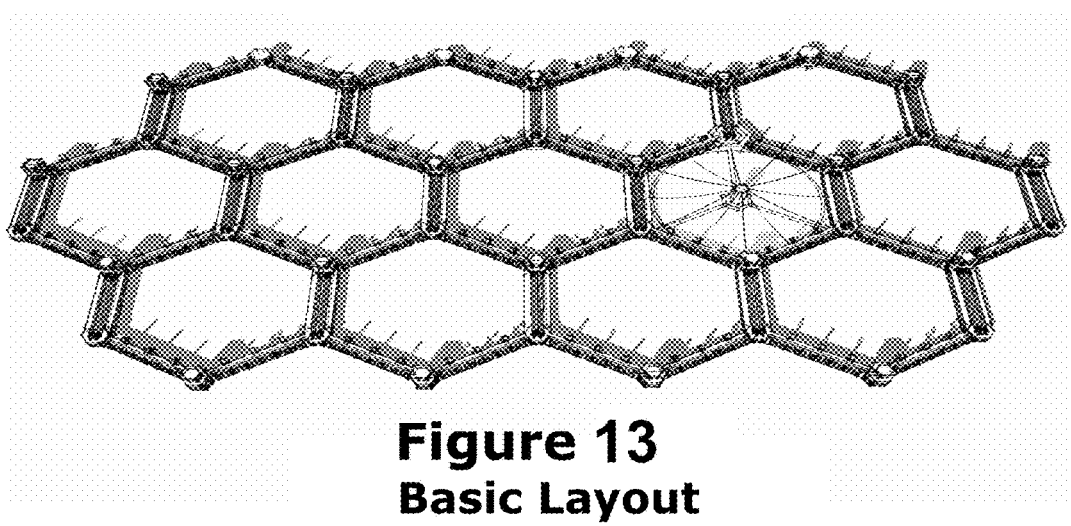
Figure 13
Basic Layout

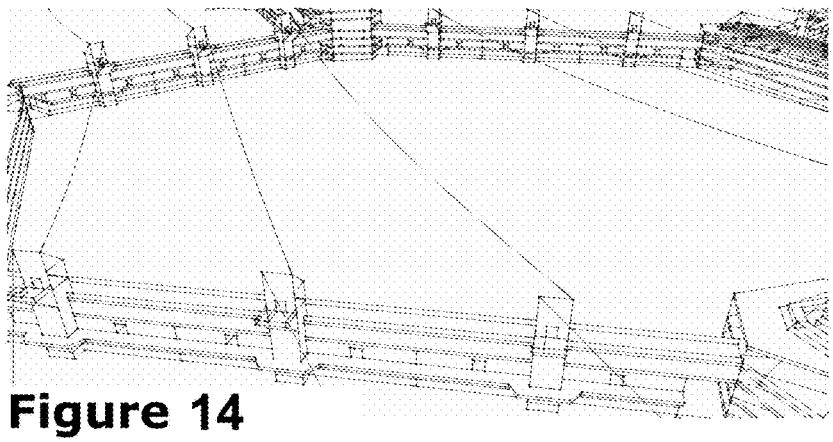
Figure 14
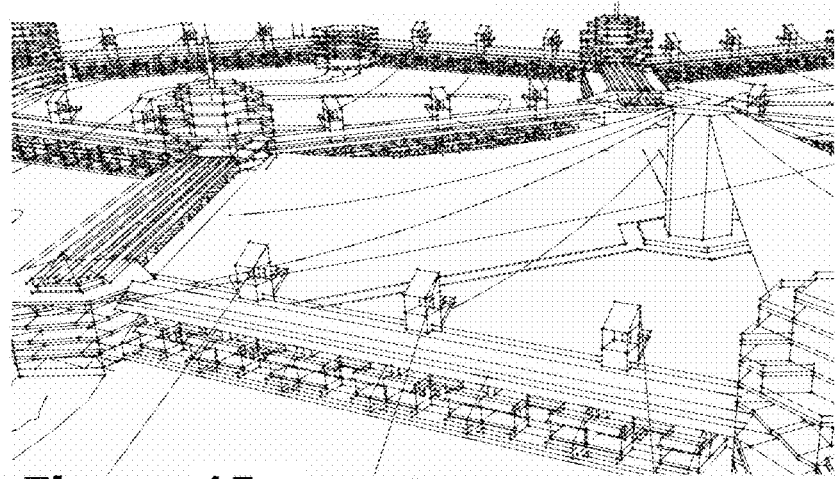
Figure 15   Enclosed Court View
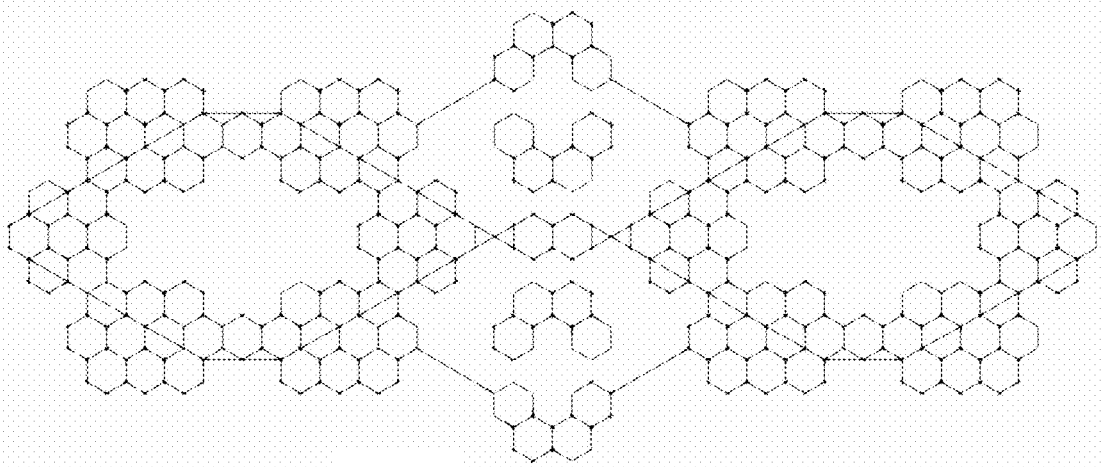
Figure 16   Layout Topography

Chinampas / Wetlands with
Tracking Solar Concentrators

Stair Case View

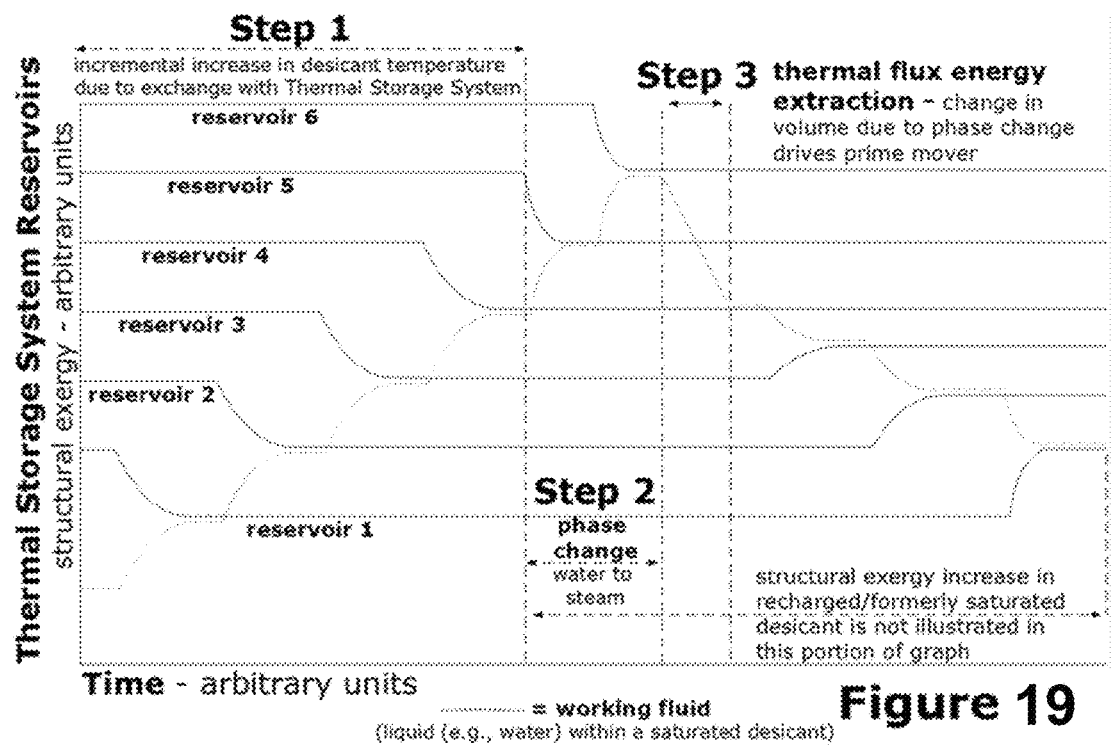

BUILDING SYSTEM FOR CASCADING FLOWS OF MATTER AND ENERGY

BACKGROUND OF THE INVENTION (1) Field of the Invention

This application relates to climate and environmental management systems, specifically to improve exergy flows, system entropy level, and resource utilization.

(2) Description of Related Art

From early history, mankind has altered his environment to harness inputs from the surroundings and provide a more suitable environment. Plantings such as hedgerows blocked wind. Swales retained water for plants. Chinampas created optimal environments for agricultural production. Fog-fences and air-wells dehumidified the air and provided water. Buildings were oriented to moderate solar radiation and high thermal mass walls captured the day's heat to be released at night. Controlled fires provided supplementary heat. Windmills captured the wind's energy and paddle-wheels captured energy from flowing water. With the advent of translucent glazing, greenhouses found new ways of utilizing solar radiation to further moderate climate. With the discovery of fossil fuels and the beginning of the industrial revolution came new methods of climate, device, and process control as well as the creation of the current heating, ventilation, and air conditioning (HVAC) industry.

The majority of these modern climate control techniques utilize large inputs of energy and are limited in scope to the services they provide (typically heating, cooling, ventilation, and humidity control). Improvements to these systems have happened incrementally and typically continue to only address these areas of climate control.

There are numerous prior arts that are referenced above that showcase many of these types of solutions for improvements to climate control. Almost all of these designs focus on a single design goal: energy conservation. A few designs, some for research and space applications, such as U.S. Pat. No. 5,322,035 to Hawes et al. 1994, for a Hydrological System for a Closed Ecological System, Cullingford, U.S. Pat. No. 5,005,787, Yang, U.S. Pat. No. 5,614,378, [closed ecological life support system (CELSS)] showcase other aspects of climate management. These patents address conditions within a sealed environment and include additional conservation parameters not typically associated with managing climates including managing available resources through nutrient, carbon, and water cycles. By expanding design focus beyond the single design goal of energy conservation into efficient resource utilization, a new approach for environmental management becomes possible.

Some of these new approaches were developed at the New Alchemy Institute in New England by Dr. John Todd and his group, which would later include assistance from William Irwin Thompson, Amory Lovins, and Buckminster Fuller. They did pioneering work with their experimental self-sufficient structure, "The Ark", in the early 1970s. This group was one of the first to emphasize aquaculture in self-sufficient home designs. Dr. John Todd later went on to develop "Living Machines", biological processes that remediate wastewater.

Arguably the best known sealed-environment project was the large Biosphere II structure in Arizona that completely sealed in eight people for two years beginning in 1991. It enclosed approximately three acres under glass, about half an acre of which was dedicated to food production using 156 edible plant species. This structure cost around $150 million to construct for a per square foot cost of around $1,100 making it unaffordable for anything but scientific research. The experiment formed the most in-depth documentation on efficient food self-sufficiency in a confined space at that time. The Biosphere II included a mountain, a savanna, a rain forest, a desert, an ocean and many other different climates in one huge glass structure. It was reported that these climates required air conditioning and air movement resulting in extremely large use of externally sourced energy. In addition, if the structure were to be without power for extended periods of time, the temperature rise would kill off most of the plants and animals.

Other types of environmental climate control systems that focus on self-sufficiency and resilience have been develop in the United States such as the attached greenhouse and the envelope home. One of the most widely known of greenhouse homes is the 'earthship' developed by architect Mike Reynolds. These low-resource input homes are built with recycled materials-predominantly automobile tires with rammed earth that provides thermal mass for passive climate control. These systems incorporate many water and energy-conserving techniques and are often built with significant food-producing capabilities.

A lesser known climate control system is that of Greenhouse Village in The Netherlands. The design of Greenhouse Village (Zonneterp in the Dutch language) consists of energy-producing greenhouses. These energy producing greenhouses increase vegetable harvests by 20% while completely eliminating fossil fuel use. The Greenhouse Village is one of the first systems to enable a completely decentralized solution for providing energy, recycling nutrients, and provide waste and wastewater treatment.

The idea of the vertical farm has become well-known in recent years as offering the possibility of food production in crowded city areas. As none have been built, the actual functionality and practicality is relatively unproven. Obvious problems relate to the fact that farming sky scrapers may experience shade for most of the day from the other nearby buildings. Also, while photosynthesis harvests energy from the sun, there is only so much sunlight per unit area of land —vertical stacking doesn't change that.

The closest in possible function to the embodiments described within this document is the Dream Farm concept by George Chan—although it is dependent upon and restricted by local climatic conditions. The Dream Farm concept has been updated to the Dream Farm-2 concept by Mae-Wan Ho. This proposed model of an integrated, "zero-emission", "zero-waste" highly productive farm maximizes use of renewable energies and turns waste into food and into energy resources without utilizing fossil fuels.

In reviewing existing patents, a good place to start is US 20080000151 which typifies the problems and responses of current art to the problems of managing a plant growing environment. Solutions for managing temperature levels include exchanging airflows between the outside and inside atmospheres. This is accomplished using active controls such as fans and a gas-fed heating system supplemented with a water thermal-storage reservoir that captures heat as it cools the environment. Later it releases this heat as required. When the greenhouse reaches desired temperature levels, air is recirculated within the systems.

There are numerous problems and liabilities of such a climate control system. The first is predicated on exchange of outside air that may contain undesirable atmospheric pollutants or pests that may adversely affect internal growth processes. Additionally, the recirculation of atmospheric gas ratios may be adversely affected by the internal air circulation as autotrophs (plants) consume all the $CO_2$ during respiration. Another problem is that of varying external environmental conditions. While equipped with a gas-heater for periods of cold, the thermal-storage reservoir does little to provide cooling when the coupled outside environment is continually warm. Also these systems presuppose outside inputs of fossil fuels and electricity in order to function.

A patent that addresses some of these issues is U.S. Pat. No. 4,077,158. This patent reflects many of the complex issues behind providing environmental control for a growing environment.

In this patent, it offers a way to utilize a reversible thermosiphon to exchange heat with a hot and cold thermal-storage reservoir. The hot reservoir also has provisions to capture the suns radiation. It also incorporates rainwater harvesting that may also affect the temperature levels of these thermal-storage reservoirs. The growing system offers several features such as segregation and filtration of the internal atmosphere to exclude pests. The reservoirs are multi-function and can act as a moat to transport vegetation grown within the system. The reservoirs also support aquaculture. It also supplements the possible cooling offered by the thermal-storage reservoir by directly irrigating plants to provide evaporative cooling and remove heat. It also goes even further in controlling the environment for the plants by aerating their roots and providing water and nutrients as needed.

These same problems, and solutions will be reviewed in the following discussion on the exergy and resource environmental management system. Before that discussion, it's useful to first look at some other technologies that may be useful in addressing these issues.

The first of these technologies is using bodies of water as a thermal reservoir, in patent 20070295489. This patent's major innovation is tapping previously unused thermal reservoirs such as swimming pools and reservoirs for fire suppression in order to reduce air conditioning expenses. It goes on to discuss how to do a heat exchange so that the fluid within the reservoir doesn't mix with the reservoir. It also goes on to discuss how to alter the temperature of the thermal reservoir to stay within desired parameters, basically consisting of using power at non-peak times. Problems with this design include the need to continually thermally condition the reservoir with active processes. In addition, it offers no remedy to keep bodies of water, such as swimming pools, at a constant desired temperature without active inputs of energy. Solutions to address these issues will be discussed.

Another interesting patent that showcases relevant technology for environmental controls is U.S. Pat. No. 7,997,079, which is the use of a thermal gradient within a sensible heat thermal reservoir. While the temperature gradient is very useful, it does suffer potential problems of mixing of the medium. The thermal energy carrier fluid also only travels from one reservoir to a client through the use of active sensors. Other problems are that it only offers a hot and cold bank. An alternative design will be proposed that addresses these limitations.

In patent WO 2013070396 A1, another interesting technology is introduced. This is quite possibly the first published patent to discuss the advantages of thermal storage in a cascading array. This technology was primarily created to address the issues of storing the thermal energy of a concentrating solar array. The interesting technology to environmental management is the use of phase change materials for the storage of heat, and how the cascade of one charged phase change material then charges the next. This has many benefits, but doesn't address being able to use sensible storage techniques in addition to latent heat isothermal buckets.

(3) Other References

Not Included

BRIEF SUMMARY OF THE INVENTION

The exergy and resource environmental management system focuses on efficient resource utilization versus the single goal of energy conservation in conventional HVAC system. One embodiment of the apparatus offers significant improvements that encompass: thermal control, atmospheric optimization, radiation control, water and material use, energy systems, system management interface, and holistic built systems. These improvements offer better utilization of available resources to provide for device, process, or space conditioning. These objects and advantages, as well as further objects and advantages, will become apparent from a consideration of the ensuing description and drawings.

BRIEF DESCRIPTION OF THE SEVERAL VIEWS OF THE DRAWING(S)

FIG. 10 is a diagram that illustrates a potential embodiment of the exergy and resource environmental management system integrated into a housing unit.

FIG. 11 is a diagram that illustrates a side profile of a potential embodiment integrated into a housing unit that shows the water way fish tanks at the rear of the building.

FIG. 12 is a diagram that illustrates a side profile of a potential embodiment of the exergy and resource environmental management system integrated into a housing unit that shows the three solar chimney common staircases and pathways that integrate into a larger network offering additional mass and energy potentials.

FIG. 13 is a diagram that illustrates a literal translation of FIG. 9 into an interconnected constructed environment that, in some embodiments, may extend into a larger network offering additional mass and energy potentials.

FIG. 14 illustrates how staircases that connect individual units to the larger interconnected constructed environment can be enhanced—as illustrated, with connecting lines for harvesting agro-food-forests planted within the courtyard, and also with solar concentrating panels.

FIG. 15 illustrates a larger interconnected built environment that moves mass through a system of ramps and tramways for bikes and personal rapid transit. Also illustrated is a tension-fabric type greenhouse structure that can shield geothermal ground based storage from possible rain intrusion.

FIG. 16 illustrates the layout of a larger interconnected built environment to a structurally coupled external environment. The lines drawn between hexagons are elevated transit systems for mass or energy transfers. Courtyards formed from such arrangements could be engineered to create specific micro-climates and for the segregation of mass and energy gradients. Although this illustration is 2-D, it could also be realized in 3-D with hydrogen or other buoyant mediums that tie to system components and offer additional options such as balloon harvester's, or even radiation system placement and orientation (communication network).

Figure 17:
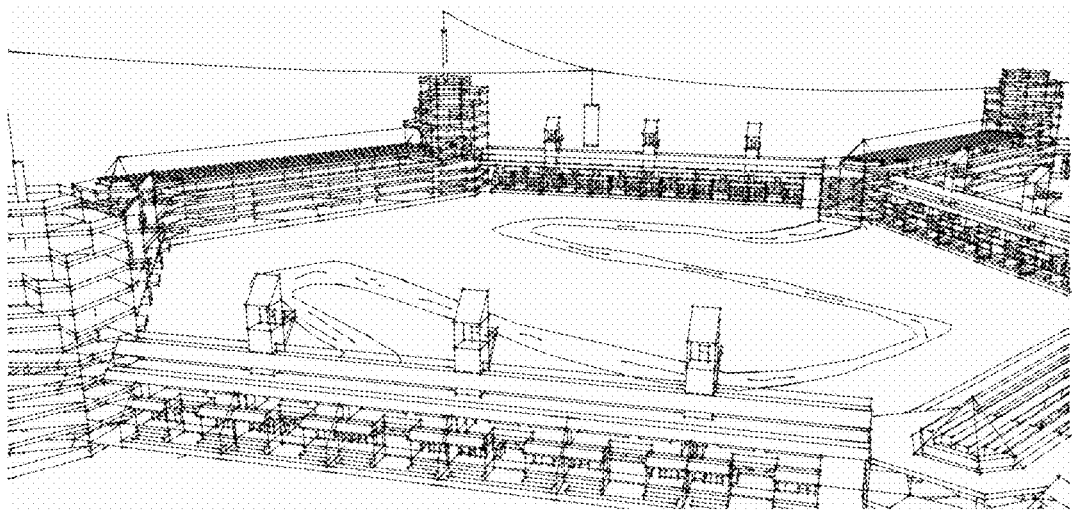

FIG. 17 illustrates the wetlands integration into chinampas. Also shown is an elevated solar focal point for reflecting panels that tracks the sun.

Figure 18:
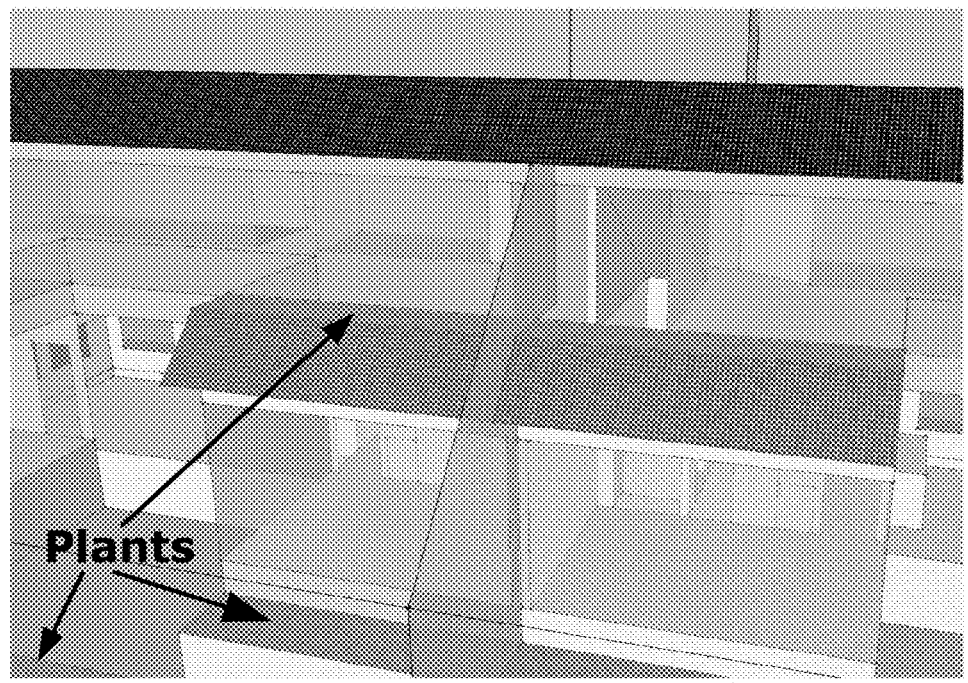

FIG. 18 illustrates a staircase that channels convective air through elements of heat exchange.

FIG. 19 illustrates the structural exergy over time as a working fluid extracts heat from thermal reservoirs until phase change followed by a step release of volume into a prime mover where after the condensate recharges and recovers a portion of the fluid exergy levels through exchange with the thermal reservoirs.

DETAILED DESCRIPTION OF THE INVENTION

Advantages

Through the control of eight primary systems: thermal management, atmospheric optimization, radiation control, hydrological systems, energy systems, material flows, system interfaces, and built structures, it is possible to create an optimized engineered ecosystem. This system provides homeostatic regulation of cascading flows of matter and energy. The embodied processes optimally improve system resilience through balancing resource use; reducing transport requirements; shortening cycles of water, for mineral cycles, and for residual flows; while offering storage of surplus and reserves of resources.

Thus several advantages of one or more aspects are to provide resource conservation, offer a safer/healthier environment, pollution reduction and/or elimination, increased reliability, durability, enhanced life cycles and ecological and social benefits. The exergy and resource environmental management system can offer upgradeability, convenience, ease of use, affordability versus pure research systems, and choices of quality through efficient decentralized processes of cascading flows of matter and energy. System integration enables biomass utilization and processing near or at the place of production to make intermediate and end use products. This creates shorter cycles for water, for minerals, and for residual flows. This reduces storage and transportation flow requirements, enables production of higher value products, and enables labor efforts to be spread out on a continual basis versus the typical seasonal labor involved in such activities.

Other advantages of one or more aspects will become apparent from a consideration of the ensuing descriptions and accompanying drawings.

Advantages of Thermal Energy Moderation

Without heat storage and/or distribution facilities, excess heat from moderated heat sources serves no useful purpose. Thermal storage enables a thermal buffer for process and space cooling and heating. When using multiple thermal reservoirs, individual temperatures can be matched to desired consumption processes (i.e. ice for refrigeration, hot water for heating, steam production, pasteurization, mesophilic and thermophilic processes, et cetera). Storage capacity can be appropriately sized for system demand over cycles of time such as diurnal (24 hours), intermediate periods (days to weeks), and of seasons (winter, spring, summer, fall). This allows for utilization of thermal energy that would otherwise be lost.

Auxiliary heat production sources (i.e. boilers, nuclear fission, solar collectors, geothermal, electric resistance, combustion, process generated heat, composting, rainwater, cogeneration, et cetera) should be closely integrated with direct utilization for environmental conditioning. Their excess heat energy can also be stored in a thermal storage medium optimally containing thermal gradations to maximize residual exergy and efficiency.

The exergy of the thermal system, as defined, is the maximum useful work possible during a process that brings the system into equilibrium with a heat reservoir; when the surroundings are the reservoir, exergy is the potential of the system to cause a change as it achieves equilibrium with its environment. Exergy is the energy that is available to be used. In contrast to energy, which in accordance to the first law of thermodynamics, is never destroyed during a process, only changing from one form to another; exergy accounts for the irreversibility of a process due to an increase in entropy as stated in the second law of thermodynamics. In a system in equilibrium with its surrounding environment, exergy is zero.

Potential uses include all devices, processes, and/or applications that would benefit from supplementary heating or cooling. This system can provide simple and effective means for maintaining a desired thermal equilibrium for a wide range of practical applications including engines, compressor based devices, evaporators, biomass dryers, chemical and biological processes such as biodigestion operating in mesophilic or thermophilic modes.

Applications for thermal management include temperature moderation for optimum biomass growth by limiting prolonged exposure to high or low temperatures which may result in severe stress and loss of productivity. Moderation of temperatures in winter for many plants often requires low night temperatures that stop shoot growth and promote flowering. Moderation of temperatures during time of flowering may be set within desired parameters to ensure optimum flowering.

Moderation of temperature cycles with this system not only substantially saves on the typical energy costs associated with thermal conditioning, but may also shorten the growing cycle and increase the amount of biomass that can be grown over the season. Such embodiments for plant and mushroom production greatly benefit from such moderation. It is through the described processes of thermal management that such a system advantageously provides thermal conditioning at previously unavailable efficiency levels.

With appropriate sizing, heat pumps combined with the described thermal storage may be run at an optimum state enabling a higher percentage of conditioning needs to be met, reducing heat pump size and associated energy requirements. This is a simple way of combining waste heat recovery with processes such as absorbent cycles to form hybrid systems to replace or supplement conventional solutions for space heating and cooling. Other embodiments may be improved by utilizing a thermosiphon to reduce or replace the need for powered exergy carrier movers (pumps) or blowers for the operating fluid.

Advantages of Atmospheric Optimization

Ventilating systems are commonly used to maintain indoor environmental standards in facilities and other buildings by removing excess heat, filtering and discharging pollutants and unwanted moisture. Economic considerations are often contrary to trying to maintain a healthful, comfortable environment since conditioned air has been heated, cooled, and often humidified at substantial expense. In addition, meeting energy targets in cold climates often requires significantly air-tight construction of the building envelope that greatly reduces air exchange. Conventional air handling systems often utilize mechanical ventilation with heat recovery to address these air quality issues.

Current HVAC (Heating, Ventilating, and Air Conditioning) systems are often based on the assumption of good outdoor air quality. Many environments around the world are subject to adverse air quality that precludes the ability to utilize externally sourced air. In these conditions, air quality becomes dependent upon additional efforts for purification.

In many facilities, poor indoor air quality has reached an epidemic level resulting in what is now termed "Sick Building Syndrome". Poor air quality causes discomfort for many people and has been shown to reduce productivity in the workplace and results in unhealthy learning environments at educational facilities. Most people spend a vast majority of their time inside, so it has become essential to find solutions to address airborne pollutants and allergens such as pollen, mold, toxins from cleaning and building products, car exhaust, smoke, and nosocomial infections like tuberculosis, varicella, and rubeola. Existing solutions to improving atmosphere suitability have relied primarily on large inputs of energy and have numerous limitations.

Advantages of Radiation Controls

Appropriate designs take into account the amount of introduced solar or artificial radiation necessary to provide for optimal levels. For instance, when photosynthesis is desired, the system ideally moderates light levels to provide for optimal growth without triggering photo-inhibition by excess light that causes photo-electro-physiological signaling (PEPS) that damages the photosynthetic apparatus and deregulates cellular processes. In addition, regulating levels of radiation over time is important for production of most nutraceuticals. As opposed to the synthetic transformation of chemicals, plant material's natural enzymes and secondary metabolites such as alkaloids, terpenoids, glycosides, polyketides, and peptides, can be manufactured through precise control of radiation, temperature, water, atmospheric gas ratios, and nutrients. These environmental changes enable the creation of desired nutraceutical products through transforming pockets of indecisive cells, natural enzymes, and secondary metabolites.

Also of importance is electromagnetic radiation's affect on biological organisms. Various scientific studies (such as covered by Carvel in The Guardian, Jun. 3, 2005,) have shown a link in increased cancer risk of children living under power lines. Other individuals (between 3-8% of the populace), have been diagnosed with electro-sensitivity. Recent studies published at http://www.bioinitiative.org/conclusions/show radiation levels of wireless communication devices at levels of 0.001 W/kg of body mass allows toxins to cross the blood-brain barrier (increasing brain cancer risk), levels of 0.04 W/kg of body mass reduce sperm count, and levels of 0.09 W/kg of body mass damages DNA and DNA repair ability. Due to these findings it is therefore advantageous to moderate exposures of radiation on the basis of the precautionary principle.

Another issue in many structures is the choice of glazing materials that are desirable for improving the quality of indoor lighting but that often experience relatively large amounts of heat flux across the glazing materials compared to other conventional building materials. This can dramatically increase the cost of maintaining the desired climate within buildings. The multiple envelope design reduces this by creating multiple zones with potentially varying climate control needs. Through various designs, this enables the moderation of radiation into multiple zones to meet objectives such as photosynthetic growth and lowering heat flux within conditioned spaces.

Advantages of Hydrological Cycles

In recent times, buildings have become one of the largest sources of water pollution across the country and the largest consumer of water. High-quality water is inefficiently used to transport domestic wastes which impede recovery and treatment by over-diluting the waste.

Water usage can be decreased by 95% in certain circumstances. Moving agricultural production into a controlled environment moderates usage of water resources and may reduce, contain, and/or eliminate pollutants such as pesticides and herbicides that otherwise might enter into the outside environment.

One major problem with wastewater reuse is the issue of toxins. When receiving wastewater from unknown sources, it may contain products harmful to system processes. These streams of water often require additional processing requiring additional expense and loss of potential nutrients. When wastewater is reused at a local level (i.e. an individual household, farm, feedlot, factory, etc.), the wastewater streams can receive minimal waste stream dilution and can be separated to isolate pathogens, particular contaminants, and nutrients thus enabling water treatment processes to be undertaken more economically.

When nutrients recovered from waste streams are combined with, for instance, food and aquaculture production systems whose products are directly ingested by system users, a self-reinforcing waste stream processing system can be created.

Of significant importance to wastewater treatment is algal technology that has the potential to solve multiple problems simultaneously. Algae based systems can remove nutrients efficiently without the energy intensive aeration process (which typically accounts for 45 to 75% of a wastewater treatment plant's total energy costs) by carrying out photosynthesis to release a continuous supply of oxygen. These systems avoid the extensive use of chemicals traditionally utilized for sludge treatment, reduce the amount of sludge generated, remove significantly more pathogens, reduce total dissolved solids (TDS), reduce biochemical oxygen demand (BOD), reduce chemical oxygen demand (COD), and simplify the treatment process. Algae based systems turn otherwise wasted nutrients into energy rich algal biomass that can be further processed to make biofuel or other valuable products such as fertilizers or neutraceuticals. In addition, as bio-oxidation processes produce carbon dioxide, algae can sequester this carbon during photosynthesises to produce additional biomass. This significantly reduces the greenhouse gas production typical of conventional wastewater management.

Advantages of Material Cycles

Technologies are shifting to focus on creating value, wealth, energy, and resources for human use from existing waste streams. Primary to the system of material cycles is the use of biomass crops and residues to minimize or eliminate fossil fuel use, decrease greenhouse gas emissions, and recover nutrients and resources that would otherwise be wasted. The material cycle preferably enables the utilization of resources as many times as feasible.

One potential embodiment features an integrated bio-reactor and/or bio-refinery that can generate desired products utilizing available resources and energy. Excess carbon can be utilized by autotrophs. Heterotrophs can convert excess oxygen into carbon dioxide. Nutrients from urea and animal wastes can be utilized for growing plants for food and other products utilizing such processes as aquaponics.

In another embodiment, organic wastes get pyrolyzed to destroy the germs, toxics and drugs in the wastes and produce carbon, i.e. charcoal, that can remove both carbon and energy from the biosphere. This charcoal can then be further processed in such processes as composting in order to establish a microbial community to create a value-add soil-amendment. In some embodiments, renewable sources of this energy comes from biogas systems and/or solar concentrators.

Advantages of Integrated Energy Systems

Naturally occurring air flow has been harnessed for centuries in order to accomplish various useful functions. Typically, wind is caused by air moving from an area of high pressure to an area of low pressure, often in a circular flow due to the Coriolis effect. Traditional fixed-position wind-harnessing devices have been reliant upon a flow of wind generated by naturally occurring environmental pressure changes. By utilizing a thermal differential within a bounded system, management of environmental conditions can produce more consistent and predictable operating conditions.

In addition, the possible use of devices that convert heat to sound and then to electricity can lack moving parts, reducing maintenance and required tolerances while improving durability. Smaller versions of such devices can be developed that won't create noise pollution as heat is converted to ultrasonic frequencies people cannot hear and sound volumes can be decreased as energy is converted into electricity.

Advantages of the Management System Interface

System resource flows of mass and energy interface with a management system. This management system ideally raises environmental awareness and allows visibility of system resources so issues can be anticipated and managed, information can be collected and analyzed, and choices can be applied to system components. Regulation of a control cycle typically has a plural of variables, including, quantity, quality, time, flow rates, et cetera. This system preferably allows for homoeostasis (including strong, weak, and structural), resilience, self-healing, graceful degradation, diversity, and elimination or minimization of critical failure points.

Advantages of the Building Systems

Abstract principles of creating an economical and ecological ecosystem can be realized on a smaller scale system, such as an eco-hamlet, eco-district, or biome, where the ideas become tangible and the use of resources and energy can be calculated along with space and construction costs.

The building systems can be engineered as a whole system to accomplish:

Reduced resource and energy consumption; Balanced resource use; Reduced noxious emissions in air, waste water, solid-waste, and building materials; Reduced transport requirements by shortening cycles of water, minerals, and residual flows; Storage and distribution of surplus and reserves; Durability, longevity, and flexibility of the structure with respect to changing process needs, along with maintenance and performance; increased comfort consisting of such things as indoor air quality; thermal comfort; daylighting; sound protection; building automation; safety and security, such as protection from EMF and fire; and to be economical in costs, construction, operation, life-cycle, and external costs.

DETAILED DESCRIPTION OF THE INVENTION

This present application claims benefits of priority of provisional patent application Ser. No. 61/692,224, filed on Aug. 22, 2012, entitled "Environmentally Adaptive Exergy and Resource Conserving Climate Management System".

Through appropriate responses of decentralization, integration, and moving towards self-sustaining processes, economies of scale give way to efficient decentralized processes of cascading flows of matter and energy. The task of optimizing flow-through and utilization of the earth's current diffuse renewable energy inputs is accomplished through managing increases in system entropy.

In preferred embodiments, integration enables biomass processing near or at the place of production to make intermediate and end products. This ideally creates shorter cycles of water, of minerals, and of residual flows, reduces storage and transportation flow requirements, produces higher value products, and distributes process work load throughout the year as seasons and harvest dates are distributed across the year.

Through novel combinations of technology, system functions are not only aligned, but interlinked with each other to moderate increases in system entropy. Optimally the unity of the system produces the system itself. Through overall system design and management of complete cycles, many such aspects of diffuse energy harvesting, regulation, and quality become possible in ways never before economically viable.

The primary systems and their various combinations enable a system platform that provides improved utilization of available resources for process enhancement, including chemical and biological processes. One particular integrated embodiment ideally creates a autopoietic ecosystem.

In this wording, the concept of autopoiesis, or 'circular organization', is defined to represent the autonomous nature of organization in living systems. The term was introduced in 1972 by biologists Humberto Maturana and Francisco Varela. Autopoietic, as defined, is an autonomous and operationally closed set of processes operating within a system. This system is "structurally coupled" with its surrounding environment, embedded in dynamic energy and mass transfer exchanges, such as weather patterns, diurnal and seasonal changes, that enable a network of production processes (transformation and destruction) of components which ideally: (i) through their interactions and transformations continuously regenerate and realize the network of processes (relations) that produced them; and (ii) constitute the domain of the system in which the components exist within the environment.

The eight inter-linked primary systems necessary to ideally realize an autopoietic ecosystem include:
Thermal Management
Atmospheric Optimization
Radiation Controls
Hydrological Systems
Material Flows
Energy Systems
Management System Interface
Built Systems The 'structurally coupled' surrounding environment could include desert regions, arctic regions, coastal regions, et cetera, that would structurally couple with these eight inter-linked primary systems to enable an autopoietic ecosystem.

Coupled environments may have naturally occurring dynamic energy and mass transfer exchanges such as exchanges of solar and wind energy, weather patterns, diurnal and seasonal changes, precipitation, erosion, and migrant species.

Each of these exchanges is moderated, even if only through attenuation, through the system's own internally occurring processes. An enhancing autopoietic ecosystem could moderate these same exchanges through its own eight inter-linked primary systems.

To understand the individual systems, a detailed description of each follows:

Thermal Management: Environmental resources are managed to moderate heat transfer and system thermal energy levels of a thermodynamic bounded system. The thermal control design moderates system entropy and ideally conserves exergy primarily through conservation, recovery, utilization, and storage of cold and heat for climate control and enhanced biological and chemical processes.

Important elements for conservation include reducing heat loss through convective flows (often involving air leakage), conduction (typically addressed by insulation), and radiation losses (typically addressed through physical structures, reflective coatings and materials).

Important elements for thermal storage include thermal conductivity of the medium, thermal capacity (how much heat can be stored), and temperature at which heat is stored. Heat transport may include energy flows through convective, conductive, and radiant means possibly supplemented with a material content exchange (such as condensate, rainwater, or phase change materials being physically manipulated through the system).

The system modulates the temperature of environmental conditioning by exchanging heat flows either directly from energy producers/consumers and/or with thermal reservoirs. Typically the rate of these energy flows (thermal flux) is regulated by the temperature differential. One potential embodiment would use a fluid heat or coolth carrying medium (coolth, as used, is the removal of thermal energy, counter to heat being the addition of energy), and utilize the temperature flux to create a pressure differential sufficient to drive the heat carrying medium through the circuit. A flow between the spaces of heat exchangers is created inducing a convective flow, optimally in a loop thermosiphon type effect, until thermal equilibrium is achieved. This effect may be enhanced by circulating the medium through multiple heat-exchanges of ascending/descending temperature gradients to allow heat transfer. The created convective current may replace the need for a powered exergy carrier mover to transport the operating fluid.

In another embodiment, an electrically conductive carrier could be used to enhance the desired relative motion of the carrier by inducing eddy currents.

Operation of one potential embodiment in a heat or a coolth input mode, utilizes a fluid heat carrying medium that flows through a succession of heat-exchange stages, optimally paralleling the temperature gradients within the thermal mass reservoir(s). Multiple temperature gradients encapsulate the thermal storage (stratified and/or multiple heterogeneous reservoirs), the thermal heat flow cascades through each consecutive temperature level adding heat or cooling energy to the storage medium. A well known continuous process to accomplish this utilizes a counter flow heat exchanger with warmer temperatures on the top and lower temperatures on the bottom.

In heat (or coolth) extraction mode, the relationship is reversed. Thus, the hottest (or lowest) temperature attained in the exchange parallels that of a thermal reservoir level. In either case, the cascaded stages are advantageously constituted by a plurality of interconnected channels communicating between heat producers/consumers and the respective thermal storage conveying heat.

Embodiments of the thermal storage system may be in the form of a single large storage vessel of vertical graduated temperatures, or with thermal storage reservoirs that are preferably arranged in ascending/descending order of temperature that are in communication with heat producers and consumers.

Thermal storage coupling may be enhanced with selection of heat exchanger(s) (such as air-to-air, air-to-water, spiral flow, condenser, micro-channel, fine-wire-heat-exchangers, heat pipes, et cetera). Generally larger heat exchangers result in lower temperature differentials between source and process fluids resulting in increased efficiency system coupling but increased equipment cost.

Utilizing a storage vessel of vertical graduated temperatures in conjunction with multiple heat exchange points allows for the system to access the temperature gradient inherent within the reservoir. Maintaining the stratification of heterogeneous temperatures is essential to conserve exergy and properly utilize a temperature gradient within the thermal storage reservoir. For this reason, multiple thermal storage reservoirs at individual homogeneous temperatures may be preferable.

In certain embodiments, this system allows for separate heat transfer mechanisms (without regard for temporal cycles and event controllers), between the storage unit and heat producers/consumers. Thermal storage reservoirs can be engineered based upon desired operating temperature of the device, process, or space(s) in which it is to be utilized.

When temperatures available in thermal storage differ from desired process conditioning temperatures, the thermal reservoir can be combined with heat pumps to serve as a thermal flywheel/buffer. With all heat pumps, the Coefficient of Performance [COP] (amount of heat moved per unit of input work required) decreases with increasing temperature difference. The greater the temperature difference, the greater the required pressure difference, and consequently the more energy needed to compress the fluid (in vapor compression cycles), resulting in a lower COP. By offering multiple temperature gradients, the thermal storage enhances the performance of many devices and processes including heat pumps, absorption refrigeration machines, space heating systems, Rankin cycle engines, Sterling cycle engines, sterilization processes, pasteurizing processes, and food processing, to name a few.

The system's thermal reservoirs communicate with the environment through heat producers and consumers. Heat consumers may include a multitude of devices, processes, and conditioned spaces too numerous to list. Heat producers may include conventional energy sources (such as combustion devices), renewable energy inputs such as process waste heat, environmental thermal inputs (wind, precipitation, oceans and lakes, geothermal, et cetera), as well as passive and active solar. These inputs connect to the system to meet the load requirements considering the economics of the apparatus and the efficient utilization of available energy. Certain combinations of these consumers and producers create a combined heat power (CHP), a combined cooling, heat, and power (CCHP) tri-generation plant, or, preferentially, a polygeneration plant.

Integrated systems often involve several heat sources, many of which may depend upon pumps, fans, et cetera, that require constant energy sources. In one optimal embodiment, the system, as designed, allows for thermal passive survivability (the ability of the structure to continue to function in absence of active inputs of energy) through the use of heat carrying fluids convective flows between the thermal energy storage system and the environment to be conditioned.

Control is optimally provided for heat transfer between thermal storage and conditioned spaces independent of input heat sources. This improves efficiency by being able to utilize lower quality energy stored at moderate temperatures.

Thermal energy management storage techniques include one or more of the following:
  Specific (sensible) heat reservoir
  Latent heat storage (phase change materials)
  Thermochemical heat storage Efficient use of solar heat and industrial waste heat can be achieved through the storage of thermal energy. Sensible heat storage creates temperature differentials within the storage volume as heat or cold is charged into or discharged from the store. For stratified storage, effective storage capacity is reduced when mixing occurs and the overall temperature approaches an average value over the entire volume. Due to this, it is important that the stratified storage medium maintains a structured layer, for instance with the warmest water on the top, and the coldest at the bottom. Higher utilization of the temperature layering of a stratified thermal storage may be achieved through utilizing multiple heat exchangers.

Traditional sensible heat storage techniques offer a number of disadvantages including substantial heat loss and relatively low energy storage density. Liquid utilized in sensible heat storage generally offers a storage density of 110 MJ/m$^3$ (31 kWh/m$^3$). Advantageously such storage fluids as water are extremely inexpensive. The primary conventional thermal energy storage techniques utilizing specific (sensible) heat thermal storage include underground thermal energy storage (UTES), water storage tanks, system mass such as concrete, and air circulation through a rock filled storage medium.

In contrast to a sensible heat storage material that absorbs and releases energy essentially uniformly over a broad temperature range, latent heat storage of phase change materials (PCM) absorbs and releases a large quantity of energy at the material's melting/freezing/vaporization point. Phase change materials offer an order-of-magnitude increase in heat capacity with a storage density in the order of 250 MJ/m$^3$ (70 kWh/m$^3$). The primarily isothermal discharge at these phase transitions enables it to be matched to specific process temperature requirements. The phase change material forms a thermal buffer that allows temperature sensitive systems to be integrated with the thermal energy storage system. This allows for managed thermal input to the process and storage of excess process heat and coolth. Ideally, this thermal management is performed along with subsidiary heat exchanges within the thermal storage device.

An example of this would be an accelerated exothermic aerobic decomposition process that provides pasteurization while operating at a optimal maximum temperature for microbial life that has managed exchanges of thermal flux with its coupled environment or thermal stores. Another example is anaerobic digestion where managing the process temperature for Mesophilic digestion produces significantly more biogas per unit time than chyrophilic-mode digestion that operates at a lower temperature range.

Another subgroup of phase change materials uses thermochemical reactions involving sorption heat or chemical heat based upon physical principles (adhesion) or chemical bond (enthalpy of reaction). Sorption thermal storage is composed of two molecular adhesion forces namely, adsorption and absorbtion. Adsorption relies on surface effects with a porous media such as silica-gel and zeolite. Adsorption techniques include Pressure Swing Adsorption (PSA), Temperature Swing Adsorption (TSA), and Vacuum Swing Adsorption (VSA). Absorption relies on the effects of mixing liquids such as $NH_3$, LiCl, and LiBr and compare to absorption heat pumps.

Thermochemical storage allows for separate, possibly long-term, storage of components without heat loss. When the components are added [A+B<->AB+heat], heat is released. These mediums can often be recharged with temperatures above 100 C and offer the highest storage densities of between 500-3000 MJ/m$^3$ (140-830 kWh/m$^3$).

Use of these various storage techniques depends on many potential factors including available energy and material flows, economics, process conditioning requirements, building codes, and space availability.

The above storage methods can combine together to form a hybrid system. One example embodiment of a hybrid system for providing thermal conditioning could combine a geothermal aquifer heat (or coolth) reservoir attached to a parking lot acting as a solar collector for heat collection and a snow storage system combined with dehumidification from zeolite adsorption to assist with latent cooling loads. Another hybrid system would utilize sensible, well chosen, process fluids in conjunction with phase change materials to overcome the low thermal conductivity of phase change materials, decrease costs, and stabilize temperature levels. Yet another hybrid system would use specific (sensible) heat reservoirs bounded between latent heat reservoirs of differing phase change temperatures. The sensible heat reservoir can bridge temperature gaps between differing phase material transition temperature points, lower cost, and provide a higher thermal conductivity material to interface with for faster charging and withdrawal. This may be used in conjunction with other thermal composites such as a metal mesh in contact with the phase change material (useful for increasing conductivity of paraffin for instance).

These materials enable embodiments that could potentially utilize the thermal storage to harness waste heat in order to desalinate water or to provide cooling via a thermal-driven adsorption chiller, preferably using water as a working fluid in order to eliminate fluids harmful to the ozone layer.

Atmospheric Optimization: In certain embodiments, minimal exchange with the external atmospheric environment is desired. This is accomplished by maintaining a segregated atmosphere within the constructed environment. Internal thermal variations cause the air within to expand and contract, possibly in relation to phase changes of materials. In addition, thermochemical processes that employ exothermic and endothermic reactions may also affect atmospheric volumes and corresponding pressure changes. These changes in volume could possibly place excessive loads upon building structures. To deal with atmospheric expansion and contraction, it is possible to create an area of variable volume in communication with the coupled and segregated atmospheres—structures that form a large diaphragm functioning as 'lungs'. Although the changes in atmospheric pressure due to external environmental changes have very little recoverable energy, in large enough scales, they may be used to enable other system processes including the production of work.

Atmospheric optimization for internal organisms and processes depends upon a desired composition and concentration of various gas ratios such as $O_2$, $CO_2$, Nitrogen, and Methane to be tailored to provide an optimal environment. Methods of doing this are based upon available energy, material inputs, along with moderated biological processes (i.e. selection of organisms: autotrophs and heterotrophs), and chemical processes (such as selection of catalysts and reagents).

Atmospheric air generally consists of approximately 78% nitrogen and 20% oxygen. For many industrial processes, gas ratios of differing concentrations are desired. Concentrated oxygen, for instance, has numerous applications including waste water treatment, aeration in aquaculture and fluid processing, pulp bleaching, glass manufacturing, and steel manufacturing as it often reduces the necessary size of equipment. Typical transport of oxygen requires additional processing such as compression or even liquefaction (such as for use by aviation pilots). By utilizing oxygen within the system, these processes are minimized or eliminated.

One technique of separating gasses involves utilizing molecular sieve properties of materials such as zeolite in order to selectively absorb certain gasses from a compressed air stream. As zeolite becomes saturated with nitrogen, compressed air is diverted to a secondary zeolite chamber where the process is repeated. This allows nitrogen from the first zeolite chamber to be released. By alternating the pressure in the two chambers, a constant supply of enriched oxygen and enriched nitrogen is produced as the zeolite continually regenerates itself through pressure swing adsorption (PSA) illustrated in figure one. The nitrogen air stream from this process will also contain elevated levels of $CO_2$ and other trace gasses. The molecular sieve aspects of the zeolite gas separation and concentration process can also be utilized with algae photobioreactor (PBR) processes described later to further upgrade gas purity.

Other aspects of air quality involve the removal of particulates and volatile organic compounds (VOCs) such as formaldehyde and benzene, oxides of nitrogen ($NO_X$) and sulfur oxides ($SO_X$) from the air. These organic compounds e.g., sulfur oxides ($SO_X$) such as sulfur dioxide ($SO_2$), and oxides of nitrogen ($NO_X$) are precursors to acid rain, while $NO_2$ is a precursor for ozone. Removal can be accomplished utilizing a convective fluid loop that flows past active agents such as catalysts, bacteria, and microbes to convert substances such as $NO_2$ and $SO_2$ into their elemental components of nitrogen and sulfur that have a relatively benign impact on the environment and with some forms utilizable as a nutrient source. Elements in this airflow can include such things as plants, plant roots, earth and other filtration devices that have been shown to advantageously alter atmospheric composition.

Photocatalysts may also be used to decompose many organic materials. The organic compounds affected include particulates (such as soot, dirt, and hydrocarbons), biological organisms (mold, algae, bacteria and allergens), airborne pollutants including VOCs, and even odor causing chemicals. In addition to reducing air pollution, catalytic hydrophilic surfaces can also purify water, kills germs, and increase the shelf life of fruit by reducing the concentration of ethylene gas (associated with the ripening of fruit) in distribution facilities.

Radiation Controls: In consideration of the greater environment in which the exergy and resource environmental management system is embedded, the primary dynamic energy inputs are typically derived from large quantities of energy flow from solar radiation. As the stability of the internal environment is reliant upon energy flows through the system and taking into account system goals of minimizing the rate of increase in entropy, it is essential to efficiently utilize available entropy levels to bring about a stable steady state environment.

Central to harnessing solar energy flow is both biotic and abiotic conversion technologies. Photosynthesis is the primary biotic method employed to convert solar radiation into chemical energy that can be utilized as fuel for biologically organisms—providing most of the energy for all life on earth, approximately 130 terawatts or six times current human power consumption. The production of autotrophs capable of photosynthesis is of significant importance to overall system design. Several techniques are utilized to create functional living ecosystems that are capable of capturing and utilizing a vast portion of the sun's energy. The three primary autotroph production systems utilize aquaponics (a combination of hydroponics and aquaculture), algae production, and polyculture/Permaculture.

The photosynthesis efficiency in plants varies between 0.1% to 8% with the intensity of light, the frequency of light being converted, the temperature, and the percentage of $CO_2$ in the atmosphere. To operate at higher photosynthetic efficiency, radiation levels are ideally managed to provide optimal levels for the photosynthesizing autotrophs within the system. This is extremely important to avoid photoelectro-physiological signaling (PEPS) that damages the photosynthetic apparatus and deregulates cellular processes, as mentioned previously. In addition to optimizing solar and artificial radiation usage for autotrophs to maximize photosynthetic efficiency, it may also be beneficial to alter radiation levels to affect production of enzymes and secondary metabolites to create specific structural exergies (structural exergy is the exergy or information stored in the structure of a material).

In addition to trying to increase the photosynthetic efficiency within individual autotrophs through providing optimized environmental controls for increased radiation utilization, the concept of efficiently utilization of the available solar radiation within the entirety of the environment is of great importance. This is accomplished in biotic systems primarily through polyculture/Permaculture. In traditional agriculture, plants are grown that are of the same height—each resulting in shade for the plants growing alongside. In nature, polycultures such as forests have many plants growing at different levels that take advantage of available light at different levels. Different plants have adapted to have different photosynthesizing requirements; some require full shade, others partial, and others need full sun to grow properly. Through proper plant selection, it is possible to create a Permaculture growing system that utilizes nearly all available light before it reaches the ground and is dissipated. Even more advantageous is the use of perennials in these systems that do not need continual planting and soil preparation (tilling) typical to conventional agriculture. Permaculture food forest systems have demonstrated greatly improved yields of biomass over annual-based systems and little to no required inputs once established. As a bi-product of their enhanced ability to capture solar radiation, their ability to convert $CO_2$ into biomass is another significant benefit compared to annual agriculture. Annually photosynthetic organisms convert around 100-115 thousand million metric tons of carbon into biomass, a number diminished with current conventional annual agricultural practices.

In addition to biotic methods of capturing and utilizing flows of solar radiation, abiotic systems can convert solar radiation into useful forms such as electricity that is useful for system processes. This can be accomplished through conventional means such as solar photovoltaic (PV) panels, solar concentrators coupled to heat engines using such cycles as Atkinson cycle, Brayton cycle, Carnot cycle, Diesel cycle, Ericsson cycle, Lenoir cycle, and Rankine cycle.

Other useful aspects of the exergy and resource environmental management system include managing levels of both ionizing and non-ionizing types of radiation. From reducing undesired levels of radiation to introducing desired types of radiation, the management of these levels enables new possibilities in process control. Examples include moderating levels of electromagnetic frequencies, including radio frequencies (EMF/RF/electrosmog) and UVA and UVB rays, or focusing UVA and UVB for pathogen elimination, altering magnetic fields (such as those that affect biological organisms including repelling sharks), activating catalysts or reagents, introduction of Schumann resonance frequency and/or irradiation for organism stimulation, sterilization, pathogen elimination, electron beam processing, and seed and food processing.

Hydrological Cycles: The system retains (stores/captures/exchanges) qualities of various cycles such as diurnal or seasonal cycles in order to capture embodied energy and moderate desired fluid and quality levels. Water within the system may be cycled through water treatment systems to produce desired objectives while maximizing resource utilization.

Knowing that contaminants are often disposed of in wastewater, it is beneficial to have two or more possible drains—one for a contaminant free source, and one or more for waste-streams that contains contaminants. For source segregation, some embodiments may have a specific drain for each type of contaminant; others may use an event based system that can be selected for attributes such as size and quality, still other embodiments may segregate waste streams based on temporal cycles and event controllers. This concept will be explained further in the operations section.

Conventional methods to remove nutrients in municipal wastewater typically involve treatment with a constant supply of oxygen through an energy intensive aeration process. This process biodegrades organic matter into smaller molecules ($CO_2$, $NH_3$, $PO_4$, et cetera) through a bio-oxidation process that utilizes micro-organisms such as bacteria.

A potential embodiment utilizing algae based systems can recover nutrients efficiently and minimize the energy intensive aeration of conventional processes by carrying out photosynthesis to release a continuous supply of oxygen. This bio-oxidation produces carbon dioxide which the algae can sequester during photosynthesis to produce additional biomass.

Certain embodiments of this system described in the operation section below enable previously unavailable options and benefits to provide for an optimal growth environment for algae that makes available the recovery of purified water through processes of evaporation, evapotransporation, and condensation. Condensed water can be cleaned and processed into potable drinking water after appropriate conventional processes.

System management of process air dehumidification may be accomplished in a potential embodiment through a condensation process as air flows past temperature gradients (either coupled directly to thermal mass or through a heat exchanger). This may be supplemented with dehumidification utilizing a heat pump, i.e. refrigerant dehumidification, removing moisture with sorbent systems, i.e. adsorbent/absorbent, or simply mixing the moist air with dry air, i.e. air cycle dehumidification. Embodiments utilizing desiccant dehumidification systems offer a low energy-consumption alternative that can be regenerated through energy conserving methods.

Once the air has been dehumidified, the ability to perform evaporative cooling is enhanced. Cooling effects can be enhanced in certain embodiments by capturing the heat produced during adsorption, and then reintroducing moisture back into the air, utilizing, for instance, an evaporative cooler.

Material Cycles: Material and energy inputs increase available options within the system. Ideally, symbiotic cycles recycle materials, such as phosphorus, until they becomes no longer practical (due to dilution, contamination, et cetera) to recycle and waste streams are purged to external waste handling systems. Of primary interest are the elements of carbon, hydrogen, nitrogen, and oxygen, and their various combinations which constitute all but one percent of living creatures (Design with Nature, Ian L. McHarg, 1971, The Falcon Press). These elements, such as carbon stored in plants, may be recovered through thermochemical and biochemical processes (burning, pyrolysis, and aerobic and anaerobic digestion including fermentation, composting, or decomposition by fungi).

The biomass production cycle typically consists of growth, harvest, transport, processing, usage, and recycling. When utilizing biomass it is preferable to consider the concept of exergy destruction, and look at the quality of the materials, first extracting and using high-value products, such as medicinal substances, polymers for plastics, and food for living organisms, before further conversion of the biomass. Structural exergy decays as ordered long molecules are converted into gaseous particles (i.e. biogas) and should be postponed when possible versus direct conversion into energy products. Therefore the next logical step, wherever possible, is direct use of materials such as wood, starch, and cellulose, before conversion, commonly through anaerobic digestion, aerobic digestion, or gasification into chemical raw materials for such uses as bio-plastics and transport fuels. Where possible the energy and heat released from these processes is utilized immediately by converting into work (such as electricity), by utilization for process or environmental conditioning, or lastly, by storage if possible. The final step is to close the cycle by re-using the released minerals and compounds to guarantee a sustainable ongoing supply of future biomass.

Current large scale algae biomass production/bioreactor systems can be divided into either open or closed systems. Open systems consisting of commercial-scale ponds are inefficient in land use because algae blooms block light so large acreage is required. They are also difficult to manage due to differing environmental conditions, particularly in winter. Also, as algae are diluted with water, harvesting becomes expensive. In addition, the open nature of ponds often precludes them from purity levels necessary for manufacturing food and pharmaceutical grade algae. Closed systems offer significant advantages for obtaining non-contaminated biomass for extraction of high value bio-molecules and for maximum $CO_2$ utilization and sequestration. This is an important consideration as $CO_2$ purchased for commercial algal production typically constitutes 40% of the raw material expenses (Molina Grima et al., 2003).

For these reasons, a new and novel algae photo bioreactor closed system has been designed that optimally benefits from the features of certain embodiments. The consumption and production of heat within the system enables the algae photo-bioreactor growth system access to thermal conditioning and material inputs utilize light radiation to process waste streams.

In the urban environment, urine is the waste fraction containing the largest amounts of nutrients while composing a comparatively small portion of the waste stream. Urine contains approximately 70% of the nitrogen and 50% of the phosphorus and potassium in all household waste and wastewater fractions. As such, urine provides an excellent growth nutrient for algae. When sufficient nutrients are supplied to a potential embodiment, either from urine, or from other processes such as fermentation and anaerobic digestion effluent, in combination with ideal temperature and $CO_2$ levels, exponential increase of algae growth rates can be realized.

As $CO_2$ represents such a significant cost of algae production, a new and novel approach for its generation has been created utilizing a mushroom mycelium production system. Mushroom mycelium produce between 3000-5000 ppms of consistent $CO_2$ in their environment which has been used in the past to supplement $CO_2$ enrichment for greenhouses as the mycelium decay organic material. In addition, a novel airflow adjustment can be made that can extract excess $CO_2$ production without affecting mycelium viability. This allows for an adjustable supply of $CO_2$ that provides additional benefits.

Studies have shown that the enzymes contained in selected varieties of fungi break down cellulose materials. This process provides the initial enzymatic hydrolysis necessary to break down complex cellulose into simple sugars which can then be fermented and distilled to produce ethanol, or to increase biogas production in anaerobic digestion. The mycelium biomass may also be utilized for many other uses such as animal feed or to make building products such as insulation, filter screens, concrete forms, and packaging materials as pioneered by Eben Bayer's EcoCradle product. In addition, mushrooms can concentrate various nutrients and contaminants (such as heavy metals) enabling mycoremediation, a form of bioremediation, of the initial substrate. In addition, mycelium mats can act as biological filters, reducing or eliminating such substances as *E. coli*.

Central to the production of mycelium is composting of initial organic feedstock. This feedstock is often supplemented with other base materials such as protein rich plant materials and manure to increase microbial populations and nitrogen content of the feedstock. After providing aeration and proper physical preparation of these materials, a composting period occurs between temperature ranges of 120 to 150° F. (49° to 66° C.). Typically this is performed outside in an uncontrolled environment resulting in uneven temperatures and areas of restricted aeration. While uniformity in temperature and aeration is crucial in proper preparation of the mushroom growing medium, it is extremely difficult to attain utilizing conventional methods.

One potential embodiment offers a contained environment that distributes these temperatures evenly (using radiant surfaces/pex tubing/proper mixing/et cetera), throughout the growth medium and provides oxygenated flow (optionally from the output of an algae photo bioreactor) to ensure the medium is properly pasteurized and free from most mushroom pests and diseases. In addition, emissions from the process can be biologically treated to reduce odors typically associated with conventional compost production and possibly reuse them as additional nutrients.

Figure 7:
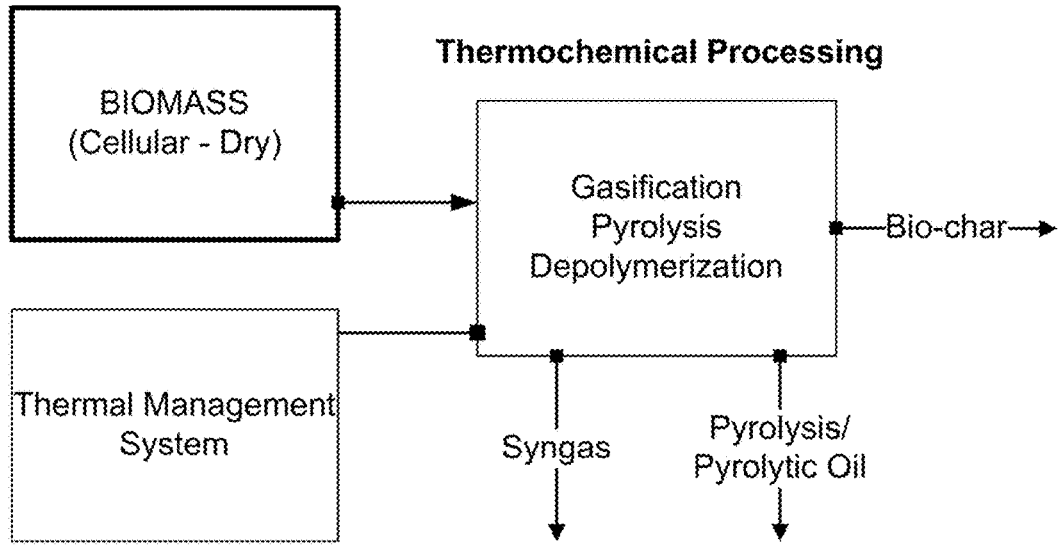
FIG. 7 is a diagram of thermochemical processing that produces syngas and bio-oil in conjunction with the supervisory management system and thermal reservoirs.

Additional biomass processing may involve different systems of thermal conditioning. Thermochemical processing is based upon pyrolysis, which includes all chemical changes resulting from the application of heat in the absence of oxygen. The resulting end products of thermochemical processing is carbonaceous solids, oils or tars, and synthesis gases consisting of hydrogen, carbon monoxide, and often carbon dioxide. Generally pyrolysis is performed either quickly or slowly depending on input material—with larger materials taking longer to reach temperature. Processing at temperatures less than 450° C. produces mainly bio-char while temperatures over 800° C. produces mainly synthesis gasses. Intermediate temperatures produces pyrolytic oil (also known as bio-oil) as illustrated in FIG. 7. Bio-oil is formed from incomplete breakdown and can also be produced in the presence of low amounts of oxygen followed by rapid cooling. Bio-oil can be processed to make fuels such as methanol and chemicals like styrene and linear alkanes similar to conventional plastics. Anhydrous pyrolysis can also be used to produce liquid fuel similar to diesel from plastic waste. In these gasification processing systems, thermal conditioning utilizing process heat and stored heat can be applied.

Yet another method of biomass processing involves utilizing a catalyst, such as the metal catalyst developed by Dr. Lann D. Schmidt at the University of Minnesota that operates at atmospheric pressure within a reactor to produce an autothermic reaction that results in catalytic partial oxidation to produce a synthesis gas in tens of milliseconds without significantly accumulating solid carbon (char) on the catalyst.

Energy Systems: Resources are converted into energy products primarily through processes of fermentation, gasification, biogas production, thermal energy conversions, photovoltaic processes, harnessing of motion, changes in pressure, and photosynthesis.

Principle factors for consideration when designing the integrated energy systems include being able to balance the demand pattern of the site for variability over time as well as in terms of end use; daily, weekly and monthly peaks may be many times the average. Because of the technology of renewable energy sources, most have a low degree of operating elasticity. Individual technologies to meet demand peaks typically require large storage systems and/or oversized facilities. Integration between end-use points and energy sources optimizes the balance between energy demand and supply. Correct design requires consideration of the simultaneous behavior in relation to inputs and to the various users. Given the availability of the quantities of energy involved, special models can simulate the behavior of the energy system to determine the best combination of processes in relation to available energy sources.

Diffuse environmental energy can be harvested, utilized, and optionally stored for process conditioning by the managed systems. Heat exchangers eliminate or reduce the need for heat pumps. Thermal energy may be transformed from a heat source into mechanical work and electrical forms. This may be accomplished in many fashions including utilizing a thermoelectric power generator, an energy system prime mover, or processes such as that governed by the Brayton cycle or Rankine-cycle for power.

Deleted

Heat pumps and Carnot-cycle operations are conventional in nature with possible enhancements from the entropy-gradient temperature storage system. The thermoacoustic prime mover heat engine operates by converting heat into sound waves that can be transformed into power utilizing piezoelectric materials that are squeezed in response to pressure, including sound waves, transforming that pressure into electrical current. These piezoelectric materials are typically located within a cylindrical shaped resonator, ideally forming a ring structure so that the pressure and speed of the air within remain synchronized in the absence of sound wave reflection. Resonator size is preferably sized to couple the frequency of sound to synchronize with that of the piezoelectric array—with longer resonator cylinders responding to lower tones and shorter cylinders responding to higher tones. Higher tones may be preferred as they can be outside of the human hearing range. Electrical voltage is produced as the sound pressure squeezes the piezoelectric device. Benefits include lack of moving parts resulting in longevity and minimal maintenance. Typically sound volume decreases as heat is converted to electricity. Increasing air-pressure within the resonator decreases the necessary temperature differential between the heat exchangers that create the convective thermo-siphon flow within the resonator. It is possible to increase the conversion efficiency of heat into sound by optimizing the geometry and insulation of the acoustic resonator and by directly injecting proper thermal conditioning.

Another potential embodiment for harnessing heat energy flux uses the pressure differences in phase change to capture potential energy, such as when a liquid changes phase and expands into a gas. This is commonly practiced with the production of steam from water in order to turn a turbine and produce electricity. By utilizing phase change materials of differing transformation temperatures, it is possible to arrange them in a temperature gradient so that heat energy flux through the system can be used for the creation of pressure differentials that can be harnessed for the production of work and energy creation.

Management System: The management system provides analysis of information on reciprocal exchanges of energy and mass flows within the system in order to benefit qualities such as temperature levels, PH levels, atmospheric conditions, gas concentrations, water levels, and radiation levels. This enables more efficient processes, such as bio-reactors and/or bio-refining, storage of process waste heat, and control and redirection of exergy flows.

Taking into account the principle of exergy, the importance of information for maintaining a dissipative structure becomes apparent. Ideally the management system would be based upon models found in nature, using bio-mimicry as the foundational principle. Ecosystems are the ultimate expression of bio-mimicry processes. A natural ecosystem is a community of living organisms, in conjunction with the abiotic and biotic components, interacting as a system, typically operating within defined boundaries. Ecosystems are defined by the network of interactions amongst organisms, and between organisms and their environment. They are linked together to maximize the reciprocal, symbiotic relationships that benefit all organisms utilizing available entropy levels and resources. Ecosystems create an optimized environment that provides homeostatic regulation of cascading flows of matter and energy.

Expanding upon these ideas, Claude Bernard conceived of the concept of Milieu intérieur, or interior milieu, from the French, milieu intérieur (the environment within). Bernard summed up his idea as follows:

The fixity of the milieu supposes a perfection of the organism such that the external variations are at each instant compensated for and equilibrated .... All of the vital mechanisms, however varied they may be, have always one goal, to maintain the uniformity of the conditions of life in the internal environment .... The stability of the internal environment is the condition for the free and independent life.

Taking as a template self-organizing biological systems, they can be viewed as dissipative structures, far from thermodynamic equilibrium, that are capable of evolving to higher levels of orderliness. In order to fulfill this requirement while efficiently dissipating/utilizing available energy, it is necessary to minimize entropy production, or in other words, minimize the rate of increase in entropy.

Self-organizing systems minimize entropy production through the use of information. This information can be used to create a patterned coherent system to minimize variational free energy (where variational free energy is a function of outcomes and their probability density of causes). In order to minimize variational free energy, the system places limits on entropy production. It does this through active interference with system processes. This active interference is ideally in accordance to the principle of least action. Regardless of the legitimacy of applying a Markov blanket within ergodic assumptions to model self-organizing systems, the principle of least action and placing limits on entropy production are notable goals for the management system.

As such, the function of the systems' internal states are dependent upon information. Information structures the organizing systems from which order emerges. It is order that enables attributes such as self-scaled stability, resilience, autonomy, sustainability, and ultimately, a stable dissipative structure. Dissipative structures highlight the coexistence of change and stability. The exergy and resource environmental management system brings a patterned form to create a stable state as large quantities of energy flow through the system. It is through the management system that entropy production limits are realized through linking together self-sustaining circular flow feedback loops.

It is with information that the management system makes decisions to alter attributes of thermal management, atmospheric optimization, radiation controls, hydrological systems, material flows, energy systems, and built systems in order to realize an autopoietic ecosystem. It is the management system that processes information versus the energy/matter processing done by other systems.

Proper operation of the management system to form an autopoietic ecosystem draws upon models compatible with autonomous systems, dissipative structures, and living systems. Two relevant models for proper system operation include the holon philosophy by Arthur Koestler and Living Systems Theory by James Grier Miller. Without digressing into philosophy, some of the more pertinent ideas include:

Living systems are inherently open systems, with dynamic fluxes of energy/matter, and information. In a given situation, information refers to the existing degrees of freedom to choose among symbols, signals, and messages. Inside these systems there exists a hierarchy of systems, each more advanced or 'higher' level made of systems of lower levels. It is subsystems that process inputs, throughputs, and outputs of various forms of energy/matter and information. Each subsystem has a simple, usually singular, task to accomplish, and only requires a relatively simple control mechanism in relation to the centralized control/administration system from which information flows bi-directionally between. Lastly, the equilibria of many processes is dynamic, being identifiable as flux equilibria or steady state.

With these concepts, in some embodiments, the unity of the system may be produced by the system itself as the system's symbiotic cycles work through reciprocity and devolved autonomy through a holistic approach, i.e. replicating nature's patterns of 'waste' from one production activity becoming a resource for yet another. The overall production cycle optimally reduces inputs, system waste, and recovers nutrients that would otherwise be lost to the environment—enabling reduction of greenhouse gas emissions through system capture of methane and carbon dioxide, as well as reduction of volatile nitrogen for example. Organic growth may be accomplished in a balanced manner through the engagement of additional cycles and processes.

Building Systems: The building systems act to structurally couple the external environment with the primary systems of thermal management, atmospheric optimization, radiation controls, hydrological cycles, material cycles, energy systems, and the systems management interface enabling an optimized engineered environment that optimally provides a homeostatic regulator of cascading flows of matter and energy.

The building systems that enable the autopoietic system to function may consist of allopoietic components—the mechanistic systems in which the product of their operation is different from the components and processes which created them (such as a product being different from the assembly line that produced it).

The built systems enable internal processes, such as energy recovery of internal processes, possibly including pressure changes as stated previously in the atmospheric and energy sections above. Local production at the source of biomass reduces costs of transport to centralized processing locations.

The structural linkage of systems may provide multiple functions. Glazing may double as collector surfaces for rainwater harvesting, angled surfaces may function for solar collection/concentration, towers for living space may double as solar concentration towers, awnings for shade may provide space for biomass growth, and linked pathways may serve as transportation networks for people, utilities, and material transport. These concepts will be expanded on in the operation section below.

Operation

As described in the advantages and description section, the eight interlinked primary systems necessary to realize an autopoietic ecosystem will be described in their operational modes.

Thermal Management Operation

Figure 8:
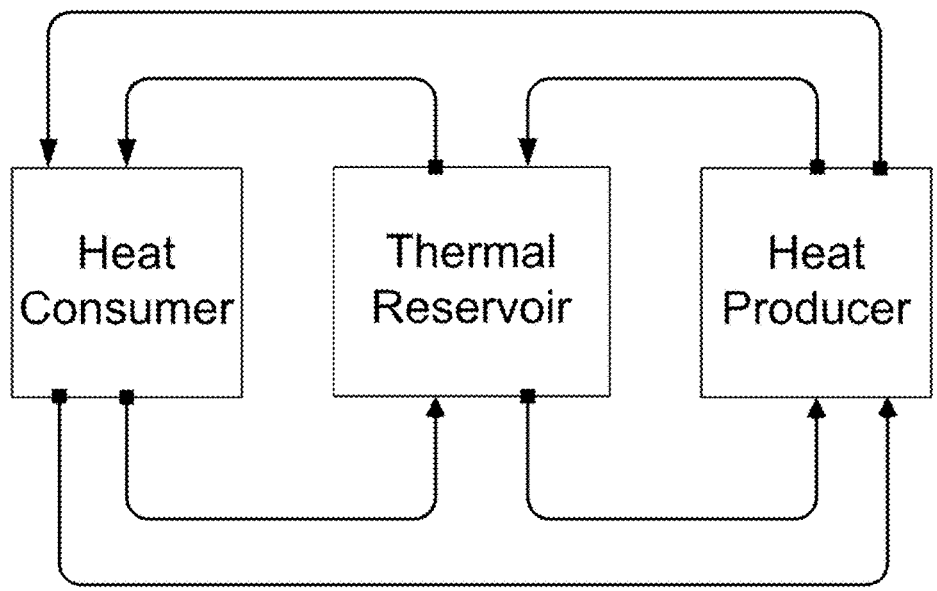
FIG. 8 is a diagram of the relationships between heat consumers and heat producers with the thermal reservoir system

An embodiment utilizing thermal management operates by coupling energy producers and consumers with thermal reservoirs as illustrated in FIG. 8. Looking at illustration 2, there are eight varying levels of heat exchange possible, in illustration 9 there are 13 possible levels. To easily understand how these cascading levels of heat exchange operate, it's convenient to look to another example of a cascade system that operates not with temperature difference, but with pressure differences. In the filling of SCUBA tanks with pressurized air, it is common practice to use multiple compressed air tanks in a cascade storage system. These larger compressed air reservoirs have differing air pressures.

Take as an example five large air tanks with air pressures of 150 psi, 500 psi, 1000 psi, 2000 psi, and 3500 psi. A SCUBA tank needs to be refilled. This tank will have an initial starting pressure. If it comes in empty, it will be connected first to the 150 psi air tank reservoir where the pressure is allowed to flow to the lower pressure tank until the pressures equalize somewhere between the two initial pressures. It is then connected to the 500 psi tank where it is filled until the pressures equalize. Likewise, this continues with the 1000 psi tank, 2000 psi tank, and lastly to the 3500 psi tank where a regulating valve disconnects the tank at 3000 psi. In this manner, the potential energy contained within each air reservoir is able to do useful work while not being at the highest potential energy of the 3500 psi reservoir. This extends the useful work performed for a given volume of air. This extension in utilizable energy for this pressure system is analogous to the exergy conserving nature of the cascade thermal reservoir system.

Now consider a SCUBA tank that needs to be filled that is at 700 psi. It would bypass connection to the both the 150 psi and 500 psi tanks and be connected to the 1000 psi air tank followed by the 2000 psi air tank and then the 3500 psi air tank. This would retain the energy within the lower pressure reservoirs while utilizing the available pressure in each of the other air reservoirs (versus, for example, drawing down the 3500 psi tank directly). This cascading system offers many advantages and is the standard for commercial compressed air filling systems.

In operation, the thermal reservoir system operates in a similar cascading manner. By utilizing multiple reservoirs of differing temperatures, aligned in accordance to increasing or decreasing temperature, it is possible to accept heat or coolth inputs that correspond most closely to a particular thermal reservoir. Likewise, it is possible to utilize cascading stages of lower-grade heat or coolth reservoirs to incrementally alter environmental temperatures, minimizing increases in system entropy and maximizing exergy.

An example of this temperature cascade system couples a fluid (air) with a single sensible heat thermal mass. This coupling is facilitated by a fine-wire heat exchanger (described in-depth in the hydrological section below). This heat exchanger is extremely efficient at transferring heat at typical ambient environmental temperatures with only a single degree Celsius temperature differential between coupled mediums after a single pass. Using this heat exchanger to couple air at 8° C. to a thermal reservoir of 30° C. would result in air exiting the heat exchanger at 29° C. If another sensible heat thermal reservoir is added at 20° C. and connecting to a serial cascaded temperature arrangement inside a conduit, the air would now exit this first exchanger at 19° C. and then enter the second reservoir and once again exit at 29° C. In this exchange, the temperature drop of the final reservoir would drop less after the heat exchange as the temperature differential was less (heating air at 19° C. as opposed to the initial 8° C.). In this way, exergy is conserved similar to the SCUBA tank filling example.

Now consider a thermosiphon that circulates a fluid system based on differential heating to establish a buoyancy driven flow for the purpose of transporting thermal energy. It operates by removing heat from a source and transporting heat and mass over a path and rejecting the heat or mass to a prescribed sink.

Expanding on the previous example, consider the same initial air temperature of 8° C. that flows through a conduit having an additional third reservoir at 10° C. After the first exchange, the air temperature is 9° C., after the second exchange it is 19° C., after the final exchange it is 29° C. Just as the exergy level change before and after the first exchange with the 10° C. reservoir is small, the thermosiphon generated between these two is likewise small. In fact, the thermosiphon would probably fail to have sufficient buoyancy to facilitate the exchange. Through the serial arrangement of cascading temperatures of heat exchange within a conduit, the greatest heating differential drives the thermosiphon. By operating between a larger temperature gradient between the 8° C. and the 30° C. reservoir in a conduit, additional exchanges of heat are enabled, thereby enhancing thermal exergy flow through the system. This is a particularly useful novel feature that can be used in many system functions.

In the next example other benefits of utilizing a cascading temperature heat exchange thermal reservoir system will be explored. Looking at illustration 9, there are 13 hot and cold reservoirs. On the left side is a reservoir labeled cold 6. This is the coldest reservoir and is surrounded by six other reservoirs (5 to 0) of increasing temperatures. On the right side is a reservoir labeled hot 6. This is the hottest reservoir and is surrounded by six other reservoirs (5 to 0). Reservoir 0 is the midpoint between the hot and cold reservoirs. These reservoirs can be labeled C6 (cold 6), C5, C4, C3, C2, C1, 0, H1, H2, H3, H4, H5, H6 and assigned temperatures. These temperatures are typically associated with the maximum extremes of temperatures experienced by the system. For a system that has solar concentrators and experiences cold winter weather, C6 may be −15° F. (−26° C.) and H6 may be 500° F. (260° C.). For the purposes of illustration, the following temperatures can be assigned to the thermal reservoirs: C5=0° F. (−18° C.), C4=15° F. (−9° C.), C3=32° F. (0° C.), C2=45° F. (7° C.), C1=60° F. (16° C.). Reservoir zero would be variable in temperature between C1 and H1, H1=80° F. (27° C.), H2=115° F. (46° C.), H3=150° F. (66° C.), H4=225° F., (107° C.), H5=400° F. (204° C.), H6=572° F. (300° C.).

Examples of these reservoirs in use would include a cold winter day at −20° F. (−29° C.) where air is directed through the system until it exchanges heat with C6 adding coolth until the reservoir is filled (preferably through a phase change process), where it then begins to subsequently fill the other cold storage reservoirs, C5, C4, C3, C2, C1, and then optionally reservoir zero. These reservoirs' phase change materials would fill at their respective isothermal levels. Reservoir zero would typically have sensible heat storage so it may be adapted to system needs. Other sensible heat storage could be bounded by the latent heat isothermal phase change materials. On another winter day, the air could be 25° F. (−4° C.) where it would be directed through the system until it exchanges heat with C3 until it is filled and then subsequently fill C2, C1, and optionally reservoir zero. On this same winter day, snow covers the structure. This thermal exergy of the snow at 32° F. (0° C.) can be used to recharge reservoir C2 through coupling with radiant surfaces charging that reservoir while melting the snow. This would result in snow removal and creation of water. The water can then flow, preferably by gravity (which is preferably arranged for through elevation so that the hottest reservoir is the highest and the coldest is the lowest) throughout the entirety of the roof structure where it would flow into reservoir C3 (and, optionally, to local secondary thermal reservoirs equating to C3), where just before insertion, it exchanges heat with the 25° F. (−4° C.) air and is cooled to a appropriate temperature for that intended reservoir (C2, 32° F./0° C.).

On a hot summer day of 90° F. (32° C.), air would be directed through the system to exchange heat with H1 and optionally reservoir zero. It would bypass interfacing with the cold reservoir to avoid a reduction in the cold storage. Solar concentrators would fill H6 on cloudless days when optimal sunlight levels allow for the attainment of maximum temperatures. Upon filling reservoir H6, it would then subsequently charge H5, H4, H3, H2, H1, and optionally reservoir zero. On cloudy days, the solar concentrators may only be capable of charging the lower temperature level reservoirs.

Internal system processes would utilize specific reservoirs. The pyrolysis of wood would utilize H6 as would a sodium-sulfur battery (preferably co-located with H6) to maintain operating temperatures. Zeolite adsorption refrigeration and dehumidification systems would utilize H4 to dehydrate the medium and then send the resulting steam through subsequent heat exchangers. This would preferably use a thermosiphon inside a conduit with H3, H2, and H1 forming a serial cascade temperature gradient array. The heat exchangers at H3, H2, and H1 would recover process heat and condense the water. Composting system processes could be initiated by coupling first to H2 and then thermally stabilized once the exothermic process charges H3. Anaerobic digesters would operate in thermophilic mode by linking to H3, or H2 for mesophilic operation. Processing requiring pasteurization could link to H3 or directly to the exothermic composting process that is thermally buffered by H3. Pasteurization through linking to H3 could also be achieved on all internal radiant surfaces in order to sterilize an entire structure (which could prove useful for eliminating undesirable constituents from bed bugs to bacteria). Mycelium inoculation would occur in substrate temperature stabilized by H1. Domestic hot water would be heated first by H1 and then by H2. Internal habitable space conditioning could utilize H1, reservoir zero, and C1. Refrigeration could link to C2 with a freezer connecting to C5. A ice-skating rink could form reservoir C3.

The system would be able to provide for system processes with the closest and lowest potential energy reservoir or producer available. For simplification, the above examples have large ranges between their temperatures. Ideally, to conserve exergy, each consumer and producer would be bounded by a thermal reservoir at just above/below its operational temperature. Fortunately there are many available isothermal phase change materials. A practical phase change material that is offered in single degree operational temperature increments has been developed by PureTemp (www.puretemp.com). It is very compatible with the biotic components of the system as it is a non-toxic vegetable-oil. These vegetable oils could be potentially generated by the system processes of the exergy and resource environmental management system—creating another allopoietic system component.

The design of the thermal reservoirs may have many elements including multiple reservoirs whose arrangement in relation to heat exchangers forms a temperature gradient. Typically these elements are arranged in a serial arrangement to form a cascading array. It may also be useful to arrange those elements to operate in parallel arrangement to allow for local processes or for such processes as the superheating of phase change materials. This superheating allows the normally latent heat reservoirs to operate with sensible heat exchange between reservoirs that could enhance the flow of thermal flux through the cascading array. This could be coupled with larger reservoirs to stabilize and provide bounds for the temperature gradient, or alternatively, reservoirs could be actively switched in relation to coupled heat exchangers by the management system to preserve the increasing/decreasing temperature gradient in consideration of changing reservoir temperatures. In this way, the integration of sensible thermal reservoirs can be accommodated without degrading the cascaded nature of the array.

In FIG. 13, and its subcomponents, FIGS. 10, 11, and 12, these temperature reservoirs are created through the constructed elements to create a human-centered autopoietic ecosystem. Looking at the 13 reservoirs, they would ideally be constructed so that H6 would be the highest in elevation with C6 at the lowest to allow for passive convective currents.

The system shown has multiple reservoirs. In these illustrations, the phase change reservoirs would be located within the structures. Additional reservoirs, such as fish tanks shown in FIG. 11, would service internal process needs. The courtyards between the structures are preferentially geothermally coupled to system heat exchangers and act as additional thermal reservoirs. In addition, coupled oceans, lagoons, lakes, ponds, rivers, streams, and creeks (simply referred to as waterways), could also act as additional thermal reservoirs to form a thermal buffer that may reduce early frost damage and create unique microclimate zones for each courtyard and structure.

Typical nighttime cooling of the Earth's surface produces cold dense air adjacent to the ground. The buildings segregate the courtyards (being bounded on all sides by structures) creating a thermocline or inversion layer in the atmosphere bounding the courtyard, and the coldest densest air falls to the ground. Having waterways within the enclosed courtyards can create a thermal differential with the air that results in a convective air cycle that disrupts the thermocline. By adjusting the temperature of the thermal-storage reservoir waterway, it is possible to affect these convective currents and alter air temperatures within the system. When connected with the heat producers, consumers, and other thermal reservoirs, these waterways offer a convenient form of climate control for plants.

The layout of waterways within the courtyards can be optimized to accomplish many functions. Having a simple circular lake creates the least amount of transitional edge between water and earth for a given surface area. By altering the shape, it is possible to include more plants around the water's edge and experience several benefits. One embodiment would have a serpentine shape zigzagging back and forth with plants surrounding the water's edges (as illustrated in FIG. 17). This layout provides several potential benefits with surrounding vegetation providing shade over waterways, reducing solar radiation exposure, subsequent algae growth, and evaporation losses. The waterways can also provide many other benefits such as providing additional water storage, increasing habitat (i.e. for waterfowl and aquaculture), providing irrigation, and processing wastewater through the use of reconstructed wetlands.

Proper system engineering takes into account elevation changes within and between the courtyards. Designing for convective exergetic flows combined with the eight passageways between courtyards allows air to flow between courtyards, with colder air flowing to lower elevation. FIGS. 14 and 15 illustrate such passageways at the intersection of angled greenhouse units with the north/south structure with top-mounted greenhouse. These passageways could be thought of as system actuators and offer features such as gates that act as valves to restrict in response to negative feedback, or fans to increase flows in response to positive feedback. In addition, these passageways could feature various types of heat exchangers to thermally couple these flows to the thermal reservoirs.

Figure 9:
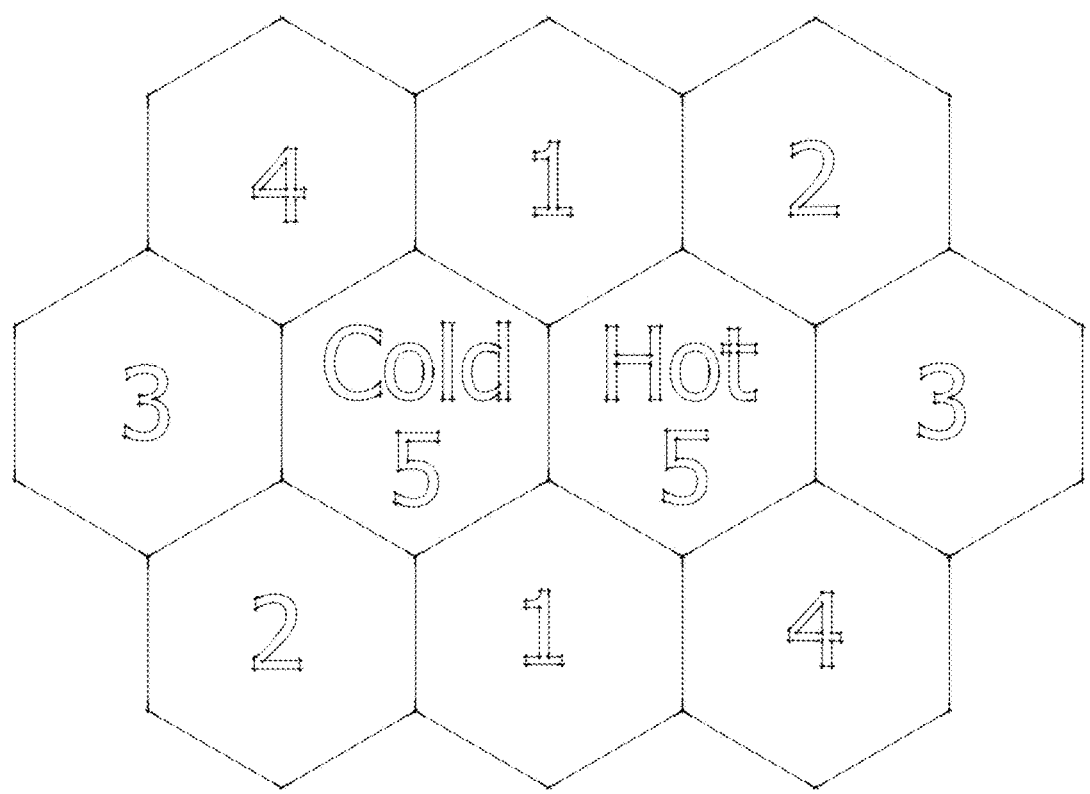
FIG. 9 is a diagram that illustrates the possible layout of a storage system for inputs of differing qualities, in particular, of a thermal storage system that ranges from relatively cold to relatively hot with 13 gradients stored.

Other aspects of the featured courtyards include geothermal storage within the earth. Shallow geothermal storage reservoirs are highly susceptible to rainfall which can strip elevated ground temperatures and direct them into the water table. One particular way to address water intrusions illustrated in FIGS. 10 and 13, where the highest temperature courtyard, H6 in relation to FIG. 9, is covered with a greenhouse. Another method to address water intrusion is to use vegetative structures that could be constructed to direct water away from geo-thermal areas. Through ecological engineering, various microclimates can be established in these courtyards that could extend seasonal growth and make possible the production of plants not typically suited to local climatic conditions.

Exergy can be upgraded through additions of energy. Examples relating to thermal levels include ore refining and pasteurization where the structural exergy is improved through thermal inputs. Pasteurization is traditionally thought of as heating above 65° C. (149° F.) to kill all germs, viruses, and parasites. But freezing is also a viable option. The management of thermal systems can moderate these exchanges in relation to time to ensure proper processing. For fish used in sushi, for instance, this could follow being frozen at an ambient temperature of −4° F. (−20° C.) or below for 7 days (total time), or, alternatively, freezing at an ambient temperature of −31° F. (−35° C.) or below until solid and storing at an ambient temperature of −31° F. (−35° C.) or below for 15 hours to ensure proper pasteurization sufficient to kill parasites.

The thermal storage system provides many benefits for aquaculture+hydroponics (aquaponics) whose operation will be discussed in more detail below.

Atmospheric Optimization Operation

Embodiments that manage atmospheric systems ideally operate through both biotic and abiotic methods. The abiotic method of dehumidification using a desiccant such as zeolite is explored in the hydrological section below. In addition to the absorption of $H_2O$, materials such as Zeolite can also be utilized to absorb, enrich, or separate out $CO_2$, $SO_2$, oxygen, and nitrogen gasses from an air stream.

To refresh zeolite as it becomes saturated with nitrogen, compressed air (potentially supplied from phase change as detailed in the energy section) is diverted to a secondary zeolite chamber where the process is repeated. This allows nitrogen from the first zeolite chamber to be released. By alternating the pressure in the two chambers, a constant supply of enriched oxygen and nitrogen is produced as the zeolite continually regenerates itself. This nitrogen air stream will also contain elevated levels of $CO_2$ and other trace gasses. The molecular sieve aspects of the zeolite gas separation and concentration process can also be utilized with algae photobioreactor (PBR) processes described later to further upgrade gas quality.

As previously mentioned, other abiotic methods of atmospheric optimization involve the use of catalysts to modify air and/or water characteristics, (such as reducing or eliminating VOCs, $NO_X$, $SO_X$ generated during biogas production). A new and novel method for utilizing photocatalysts is where a stream of air flows, due to a thermosiphon effect, over a surface containing a photocatalyst, such as titanium dioxide. When connected to the thermal reservoirs described above, the air stream continues to flow when the airspace is either warmer (charging the reservoir), or colder (withdrawing heat from the reservoir). In this manner, heat flux enables the driving of the fluid across the photocatalyst surface.

An embodiment that manages the atmospheric system operates from biotic methods utilizing an algae photo bioreactor which generates $O_2$ and sequesters $CO_2$ while reducing or eliminating VOCs, $NO_x$, and $SO_x$. $CO_2$ enrichment can be provided by mycelium as previously mentioned. Output from the APBR can enhance dissolved oxygen (DO) in aquaculture production systems. The operation of these systems will be discussed further in the sections below.

Another embodiment of the atmospheric system utilizes the known effect of microbial growth on plant roots to filter air (U.S. Pat. No. 5,853,460). In the embodiment illustrated in FIG. 4, air is channeled through plant roots growing in a hydroponic arrangement (preferably utilizing aquaponics). Preferably this air flows due to a convective cycle created by the temperature gradient with the thermal reservoir system. This air flow optimally provides appropriate temperatures for desired plant production. As the air flows past the roots, various airborne toxins, volatile organic compounds, radon, et cetera, are removed and transformed naturally into harmless substances that the plant removes from the environment.

In addition to addressing the issue of contaminants and air quality issues, atmospheric controls allow for increased options regarding desired gas concentration levels. This can be particularly useful for changing attributes of plants. For instance, limiting $CO_2$ to a plant decreases its ability to grow but also has the effect of creating higher nutrient density. The combination of inputs and outputs from system producers and consumers can create symbiotic combinations that affect plant's enzymes and secondary metabolites such as alkaloids, terpenoids, glycosides, polyketides, and peptides. Through the enablement of biotransformation, the management system offers a new level of process control.

All of these atmospheric processes are preferentially utilized inside a segregated atmospheric environment. This allows for process operation independent of outside air quality that may be affected by factors such as outside industrial processes. In FIG. 18 the convective air loop utilizes the staircase inside the structure of FIG. 10. This is used for recirculation modes. When seeking fresh air inputs, the staircases shown in FIG. 12 can be used to either draw in cool air or exhaust hot air in conjunction with greenhouse vents). This fresh air input can then be further conditioned using the previously mentioned techniques.

Radiation Controls Operation

Many of the radiation controls within the system have been discussed in previous sections, particularly that of biotic controls such as vegetative cover over waterways, autotroph production systems utilizing aquaponics, chinampas, permaculture, and algae photo bioreactors.

Novel abiotic components of the radiation controls are illustrated in FIG. 13, and its subcomponents, FIGS. 10, 11, and 12. In FIG. 13, there can be seen 20 towers 9 stories in height. This can best be seen in FIG. 15. In FIG. 15, the perspective is from the orientation facing the sun. The back of these nine story towers can act as a solar concentrating tower for the focal points of reflective surfaces. These reflective surfaces are located at the top of the three staircases—solar chimneys in FIG. 12. The top deck railing as well as other structural members may also be used as reflectors that may track (or be fixed) and direct sunlight to the back of the towers that act as solar energy concentrators in one potential embodiment. Another embodiment would utilize an adjustable focal point that connects via cables to the top of 3 towers that form a tripod as illustrated in FIG. 17. This would be similar in design to the beam steering mechanism for the feed of the Arecibo Radio Antenna in U.S. Pat. No. 3,273,156. To save money and reduce the amount of equipment, the angled surfaces could be directed at towers or floating adjustable focal points contained within other courtyards.

The hexagon building design in FIG. 13 has greenhouses running north-south for part of its structure and 30 degrees off of the local solar south (solar north in the southern hemisphere) for the other structural parts. This pattern provides optimal light radiation patterns. Total solar gain is only reduced by ten percent on each of these angled structures versus true solar south, but when used with fixed reflection points, the combination of the two sides enables solar gain to be utilized slightly longer (earlier in mornings and later in evenings). The connected design of these buildings also enables light paths to be formed for optical light networks for communication purposes. Another embodiment may modulate properties of incoming sunlight for communication through utilizing a heliograph in conjunction with a radiation processes controller.

Minimizing unwanted radiation can also be achieved through careful and judicious use of radio frequencies (RF). Ideally, all systems would apply the precautionary principle and limit RF radiation. In addition to only using very low power RF devices such as Bluetooth devices operating in class 2 (2.5 mW) or class 3 (1 mW), by using communications over optical light networks, RF radiation exposure can be significantly reduced. However, for communication outside the connected structures, radio waves can be very useful. A novel way of doing this is by creating a lighter than air platform upon which radio communication equipment is mounted. This equipment can then operate by line-of-site to distant communication points, reducing required power and through application of the inverse-square distant law, emissions to the structures can be significantly reduced. Ground communication with the floating radio platform could be accomplished by a tethered cable, or through modulation of light (such as LiFi), or through utilizing a short-wave (such as microwave) radio communication link located far from the structures (such as centralized in courtyards), that is connected through light based communication (such as glass fiber) in order to limit RF exposure. Other forms of radiation, such as EMF from power distribution networks, could be addressed by preferably utilizing static magnetic field systems such as DC power transmission, or through proper system engineering such as using shielding (i.e. conduit systems) for AC power systems.

Deleted

Other potential radiation benefits from structural design are shown in FIG. 10 showing an integrated greenhouse housing unit where vegetation in the central section can be illuminated so that it functions as interior lighting. Also shown in FIGS. 10 and 11 are the fish tanks located at the rear of the structure. This design is important and beneficial for minimizing light input into the fish tanks which would promote unwanted algae growth that would consume the ammonia fish waste that normally is utilized in the plant grow beds contained within the greenhouse.

Also illustrated in the figures referenced above, is the double envelope aspect of the dwelling. The initial double envelope design literally created a box within a box, which did reduce thermal losses due to providing a thermal buffer zone around the structure. However this added great additional expense. The main feature provided by these designs was the thermosiphon convective air loop that exchanged energy with the earth, typically the sole thermal reservoir but sometimes supplemented with a pool in the greenhouse area. This provided a degree of thermal stability to the system, particularly for large temperature gradients between conditioned spaces and the outside environment and lowered the heat flux within conditioned spaces.

Figure 1:
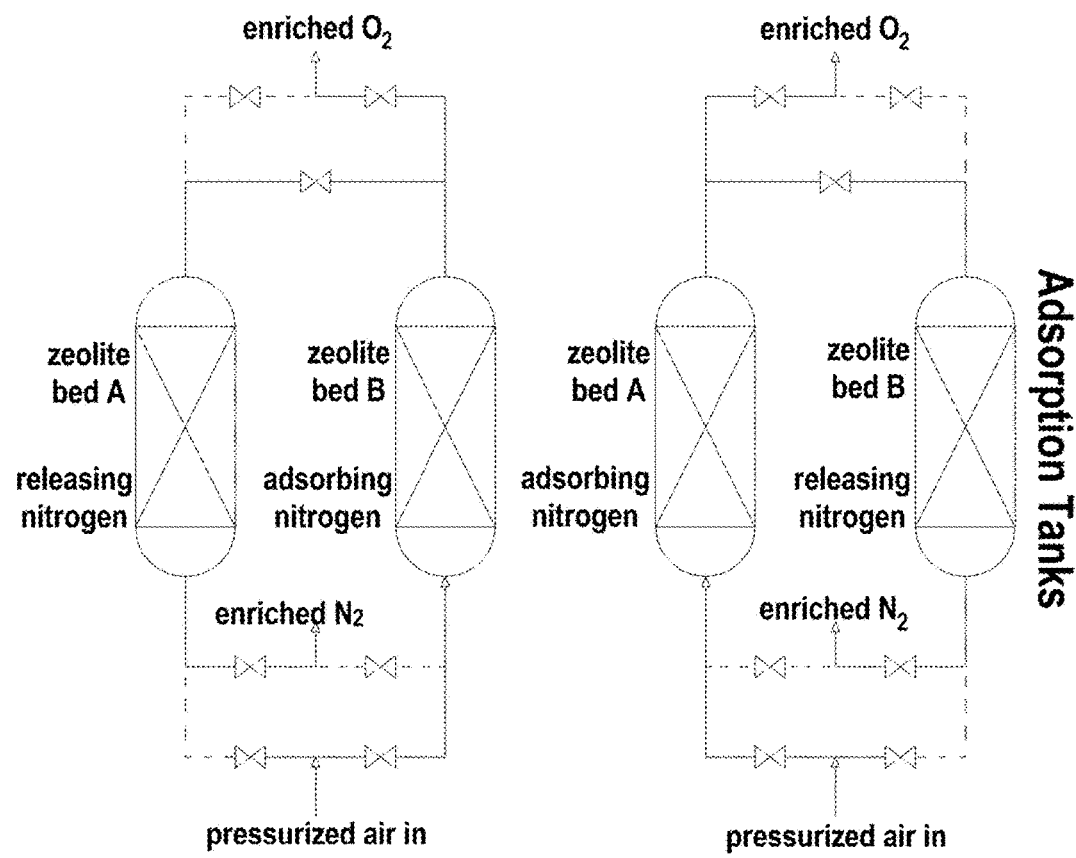
FIG. 1 is a diagram that illustrates the pressure swing adsorption cycle used to segregate and concentrate atmospheric gasses.
Figure 2:
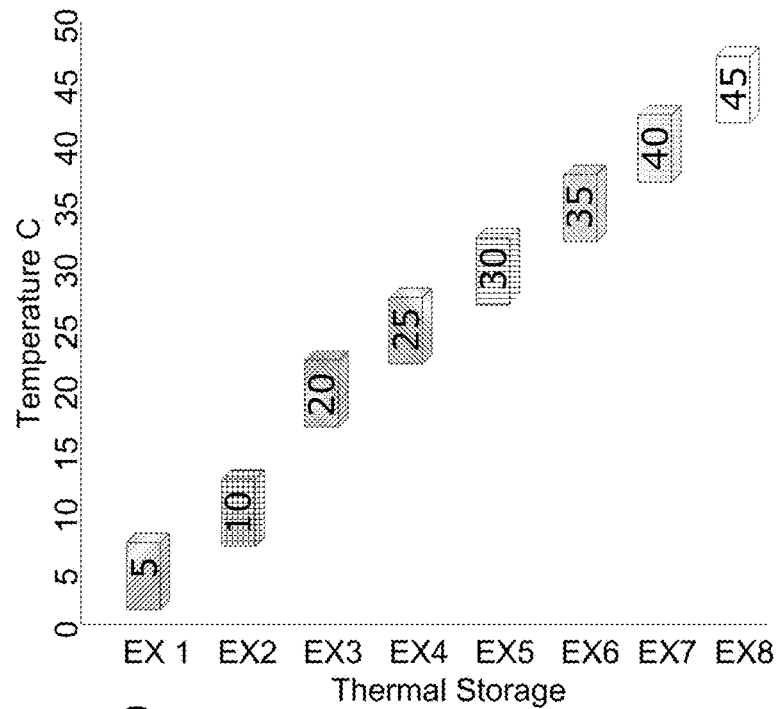
FIG. 2 is a diagram that illustrates the cascading nature of the thermal reservoirs.
Figure 3:
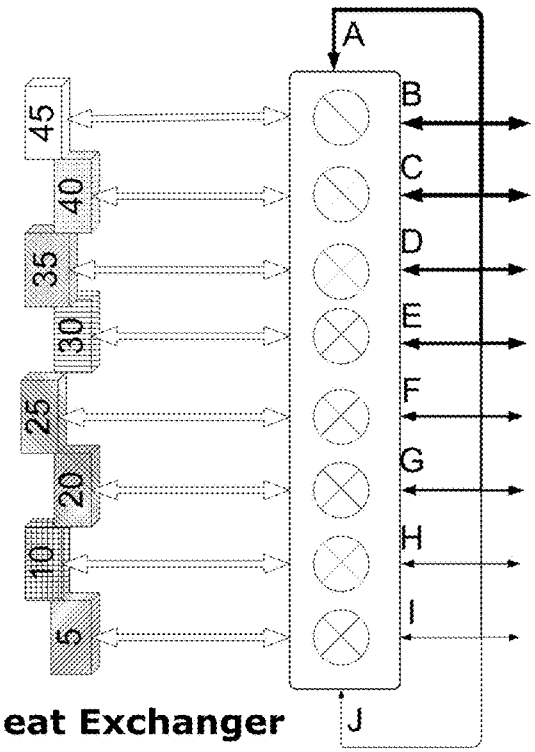
FIG. 3 is a diagram that illustrates the thermal storage utilizing multiple heat exchanges corresponding to differing temperature gradients.
Figure 4:
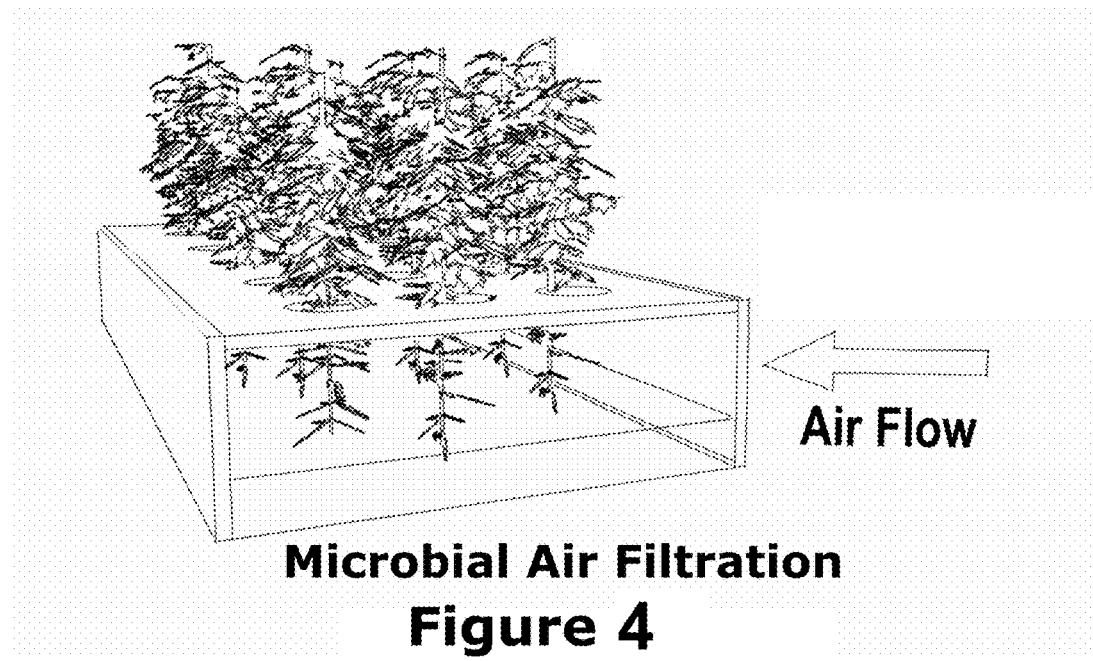
FIG. 4 is a diagram of an aquaponics grow trough that channels air past the roots for air purification.

In this design, the double buffer zone has been preserved in the greenhouse portion of the building. The design improves upon the original in utilizing a staircase to move convective air flows past a thermal reservoir. In addition, this staircase connects to another staircase that can be used as a solar chimney when used in an open mode (allowing air exchange with the outside environment). This design eliminates the original box-within-a-box design and the associated costs while still offering the same features. This can be an individual thermal reservoir, or, preferably, a serial cascaded array within a conduit that can enhance heat exchanges and preserve the thermal exergy (temperature) of the exergy carrier (air). In addition the structural exergy of the energy carrier can be altered as humidity is condensed and/or is absorbed by a rechargeable desiccant, with possible additional processes including photocatalytic surfaces, and filtration by physical media and/or plant roots as illustrated in FIG. 4.

Other aspects of radiation control include interacting with building elements to restrict introduced solar or artificial radiation such as louvers, direct and concentrated light structures, thermochromic, photochromic, electrochromic and photoelectrochromic technologies, and retractable shade netting, in conjunction with radiation sensors, or with input from the management system in order to regulate against excessive radiation exposure for plants and internal processes. Solar night-radiation loss is controlled with insulated Mylar-thermal blanket blinds and/or rolling metal storm shutters that also protect against potential storms/threats. Supplementing process radiation needs are accomplished through items such as grow lights, reflectors, and light pipes.

Another potential embodiment would utilize the modulation of radiation within the system for communication purposes. This may include free-space point-to-point optical communication, using incoherent sources of light (like LEDs), which potentially have ten thousand times the bandwidth of radio waves, to form a Li-Fi ad-hoc network. Another embodiment may utilize a heliograph to moderate properties of incoming sunlight for communication. Proper system engineering could address known limitations of such systems by possibly managing atmospheric absorption, rain, fog, snow, interference, scintillation, shadowing, stability in wind, and optical clarity (through reduction of smog). Similar designs can address the full electromagnetic spectrum including radio-waves, infrared, visible, ultraviolet, X-rays, and Gamma rays.

Another potential embodiment that moderates radiation utilizes zeolite as a filter material to remove radiation particles, preferably from a fluid circulating in a thermosiphon, thereby eliminating the need for powered exergy carrier movers.

Hydrological Cycles Operation

The system illustrated in diagrams 10-15 has many novel features in relation to the hydrological cycle and the use of water's exergy within the system. When considering water, it is convenient to think of inputs and outputs. Water can enter the system through many mechanisms including from rivers and streams, from municipal water systems that are fed from reservoirs, and from precipitation.

One novel aspect of the system is the ability to capture and store the embodied energy within precipitation. Rainfall in summer has a much different temperature than that captured in winter. Through interfacing with the temperature gradient aspects of the thermal storage system, these properties can be captured and preserved separate from the other aspects of the water such as water quality.

Rainwater harvesting is complemented by storage within the system. Water reservoirs double as thermal-reservoirs and can be coupled to the cascading thermal reservoir array. As water is used within the system, many novel aspects become possible based on system design.

Water is used in many processes, but in the illustrated embodiment, its primary use is for biological processes including production, maintenance, and molecular decomposition. One of these processes, illustrated in FIG. 10, is the production of crops in hydroponic grow beds using nutrients from aquaculture, commonly referred to as aquaponics. Aquaponics works by utilizing bacteria, specifically Nitrosomonas and Nitrobacter to convert ammonia into nitrite, $2\ NH_3 + 3\ O_2$ become $2\ NO_2^- + 2\ H_2O + 2\ H^+$ and then into nitrate where $2\ NO_2^- + 1\ O_2$ become $2\ NO_3^-$, in order to replenish the nitrogen cycle.

Some of the novel aspects related to this particular growing system is the management of the thermal system, using fish tanks as thermal reservoirs, to capture losses due to evaporation, evapotranspiration, and potentially perspiration. This is accomplished in this embodiment by using the staircases as a conduit for which air flows in a thermosiphon loop. This thermosiphon loop enhances thermal exchanges with the thermal reservoirs as the fluid flows past multiple temperatures gradients within a conduit. As the temperature of the air decreases through heat exchanges with the thermal reservoirs, the dew point is reached and the water condenses, which can then be available for additional system processes. In this manner, it becomes possible to reclaim water typically lost to create a new, practical, recirculating water agricultural system. This same process can be utilized to make a drying system for silage, food preservation, et cetera.

Proper design of the heat exchangers is important for proper system functioning. Most flat surface heat exchangers are poor at heat transfer with air offering only a 20 $W/m^2K$ heat transfer coefficient. This can be addressed with other types of heat exchangers such as the plate fin heat exchanger. However, with plate fin heat exchangers, when the plates are spaced too close to each other, the water condenses and sticks between the plates and must be removed (often through using compressed air) to restore the heat transfer properties. Fortunately there is an alternative design called a fine-wire heat exchanger where the surface tension, even with zero contact angles, only allows for the condensate to take the form of very fine drops so that the Stanton number does not change in response to condensation. This exchanger has been demonstrated to be capable of 300 $W/m^2K$ (according to www.fiwihex.nl) and is described in U.S. Pat. No. 5,832,992. In a properly engineered system, this allows for heat transfer with only a single degree Celsius temperature differential with the coupled medium.

To reduce levels of humidity below that available with the fine-wire heat exchanger, another novel method of dehumidification is possible using a desiccant such as zeolite. This desiccant could be utilized in a conventional wheel arrangement, allowing desiccant chambers to recharge while another is in use either by coupling with a lower humidity environment or through recharging at high temperatures. A novel method of dehumidification is to use the thermal reservoirs to recharge the saturated desiccant by creating an thermal exergy flow that increases in temperature through exchanges of heat with multiple reservoirs of increasing temperature until the water within the saturated desiccant changes phase into steam, is release and subsequently condensed into water through various heat exchanges that also serve to recapture the heat energy.

In FIG. 19 the heat sources and sinks supply steam:

Step 1 where a desiccant is incrementally brought up to temperature using the temperature gradients of a thermal storage system, Step 2 contained water changes phase into steam, Step 3 steam is released where thermal flux heat energy drives volume change due to phase change, Step 4 steam operates said prime mover.

Other aspects of the exergy and resource environmental management system include maintaining the structural exergy of water through segregation based on time and event. With sufficient segregated storage reservoirs, the water can be stored incrementally, time and event registered, and ultimately tested to verify quality. The management system can offer additional segregation options. Since fluid storage space can be limited, it is possible to combine multiple events into a single reservoir. Predictive analysis is useful for determining the quality of water from a particular event so that it can be segregated and combined with other water of similar quality. Prediction can also be useful in determining appropriate utilization of fluid levels in relation to reservoir reserves and predicted replacements from seasonal inputs.

A common example of such source segregation is black water and grey water. Segregation can be accomplished in many ways including direct user intervention, analysis of physical qualities, analysis of real or near-real-time testing, analysis of data (such as pollution indexes and industrial events—including events such as pesticide application), and physical process segregation. In consideration of grey water and black water, this separation is done through physical process segregation at the fixture, with sinks drained to the gray water tank and the toilet drained to the black water tank. This is common practice for RVs where segregating wastewater reduces cleanout requirements and accommodates space for essential processes.

Unfortunately, while wastewater segregation into gray water and black water does result in some benefits, it still results in exergy destruction—that is, the quality of water is degraded as high quality water mixes with lesser quality wastewater. A common example of this includes the water that is wasted when waiting for the water temperature to reach a desired level. This water could have been reused for other purposes, but, instead, is often mixed with contaminants that disallow the reuse of that water. Another example is the mixing of urine, generally considered a sterile medium high in nutrients, with feces. The benefits of segregation have been realized by using toilet seats that feature urine separation and with urinals. This segregation of urine from feces has been found to be highly beneficial in composting toilets as the liquid portion can be detrimental to the aerobic processing of feces.

In consideration of wastewater as an exergy carrier, with each addition and input having unique quality characteristics, it becomes possible to create novel processing methods and controls. Using the principles of time and event based source segregation to waste streams can improve quality and lower processing requirements by mitigating increases in system entropy. Taking again the example of water flowing from a faucet until it is warm, the event of using water would advantageously be further divided over time to distinguish sub-events, such as once the water is warm and begins to be utilized and mixed with contaminants (such as surfactants/soap). This information can be used to direct flows to appropriate reservoirs or secondary uses from user intervention or automated processes. This may be accomplished by operating multiple drains or other segregation methods. These processes enable a distinct processing system optimized for a particular contaminant, thereby minimizing or eliminating additional downstream processes that must be increasingly complex to address a mixed waste-stream.

When considering segregation based on event and sub-events, it becomes possible to distinguish waste streams between different processes and users. Returning to the example of a urine separating toilet, it can be advantageous to further segregate the waste stream. This is beneficial when the urine may be utilized as a nutrient that will enter the food system. Consider a particular person in a household that is taking a petrochemical based pharmaceutical or antibiotic. It is advantageous to segregate out that waste stream to be processed differently than that from a healthy non-medicated individual. Event and time segregation offers the ability to segregate out other common contaminants such as fluoride from toothpaste, petro-chemical based products such as pharmaceuticals, antibiotics, cosmetics and lotions, heavy metals, and man-made organic compounds, colloidal materials, and suspended solids, that may end up in wastewater. The management system could use these principles to segregate each event and combine similar related events for downstream processing (such as remediating the same contaminant). One interesting example of this is managing waste streams based upon the diet of the individual. Urine or feces could be separated based upon an individual's food selection—possibly resulting in higher residual nutrients. This may change daily and have resulting changes in waste exergy levels. By capturing this data and segregating waste streams, it is possible for downstream processes to be custom tailored for changing exergy flows.

In addition to segregating waste water based upon contaminants, the thermal exergy can also be preserved in a manner similar to that applied for rainwater. A method of doing this is with multiple drains that would segregate material content based upon temperature, relieving the necessity of heat exchange between the exergy carrier and the thermal reservoirs at individual drain levels.

Remediation of wastewater may be divided in many circumstances into three categories—water quality of sufficient quality to feed to a constructed wetland, water requiring treatment by engineered living machines, and wastewater requiring conventional treatment (such as anaerobic settling tanks with sub-surface drain fields). These technologies can also be combined (such as solid separation in settling tanks to reduce suspended particles, precipitate and water turbidity), liquid processing by living machines, and final treatment with a wetland). Remediation of waste is preferably accomplished through mentioned catabolic processes of aerobic, anaerobic, and catalytic processes, in addition to bioremediation, phytoremediation, mycoremediation, mycofiltration, and other such technologies. The information utilized by the management system can determine appropriate responses that utilize waste processes to retain optimal exergy flow through the system.

Material Cycles Operation

Material cycles involve the anabolic (production) and catabolic (degradation and dissipation) processes. These processes can be further divided in relation to being internal to the structures or external in courtyards and surrounding managed areas.

In the courtyards, the serpentine waterways, fed by flows of wastewater treated by wetlands, create a self-irrigating system once plant roots are established. Due to the earth being moist and the capillary action of water being pulled upwards by evaporation, soluble nutrients stay suspended and available to the plant roots—creating the perfect root zone environment. This is similar in function to the chinampas, created by the Mayans in Mexico, that were likely the most productive agricultural system created to date. With the novel improvements from thermal management, wetlands can continue to function during winter seasons, fixed film ecologies that provide extended surface areas for microbes and beneficial bacterial biofilms are supported, and additional choices in compatible species can be made available for outside growing systems. Other growing systems within the courtyards are preferably based upon permaculture principles and ecological engineering that create food systems, such as food forests, that function like ecosystems. The external environment beyond the courtyards would be open to native species to colonize alongside ecologically engineered ecosystems—nature partnered with human stewardship.

Internal anabolic processes include aquaponics, which utilizes many aspects of the exergy and resource environmental management system to produce both fish and plants. In addition to the thermal and atmospheric aspects of aquaponics previously covered, other important elements include the addition of fish food. This food supply is dependent on the type of fish, but should be composed of a proper balanced diet of autotrophs and heterotrophs for optimal health. This diet may include algae, other fish, worms, and insects.

Another novel embodiment for anabolic production is the production of algae. This can be performed externally in surrounding waterways or internally with algae photo-bioreactors (APBR). External processes can benefit from the novel thermal conditioning provided by the heat of thermal reservoirs to extend production during cold periods. An example of internal processes is illustrated in FIG. 10 that shows two angled surfaces that are algae photo bioreactors. The algae photo-bioreactor (APBR) harnesses radiation (solar and/or artificial) for photosynthesis and provides oxidation for other cycles while increasing in biomass. This system can integrate with the urine separating options mentioned above together with source segregation to choose between the two bioreactors dependent on the particular event (urination). As mentioned previously, this can separate nutrients intended to be recycled into the food stream (such as the creation of nutraceuticals or fish food) from nutrients that may have potential contaminants that may be better utilized to produce energy products through processes of anaerobic digestion to produce biogas, or further processing to separate carbohydrates and algae oil for possible conversion into ethanol and biodiesel fuels.

In addition to anabolic processes, material cycles also include catabolic processes. These processes are often symbiotic in nature. Take for instance the production of fish food. The production of fish food can be dependent upon a catabolic process of digestion. One well known method of supplementing fish food is through vermicomposting to produce detritivore worms and casting rich soil from organic based materials. Another method of fish food supplementation is with black soldier fly (Hermetia Illucens) larva that can convert organic materials from plant and animal origins, including feces, into proteins. These flies are both a detritivore and coprovore and can be used for manure management. Advantageously black soldier flies are not known to be intermediate carriers of parasitic worms and significantly reduce $E.\ coli$ 0157:H7 and *Salmonella* enteric. Worms and insects act through catabolic processes of digestion to create an anabolic production of increased mass. Through this biotransformation they act as exergy converters—transferring the exergy of waste materials into nutrients, in the case of the black soldier fly, proteins, calcium, and amino acids, that are capable of being digested by heterotrophs.

Figure 5:
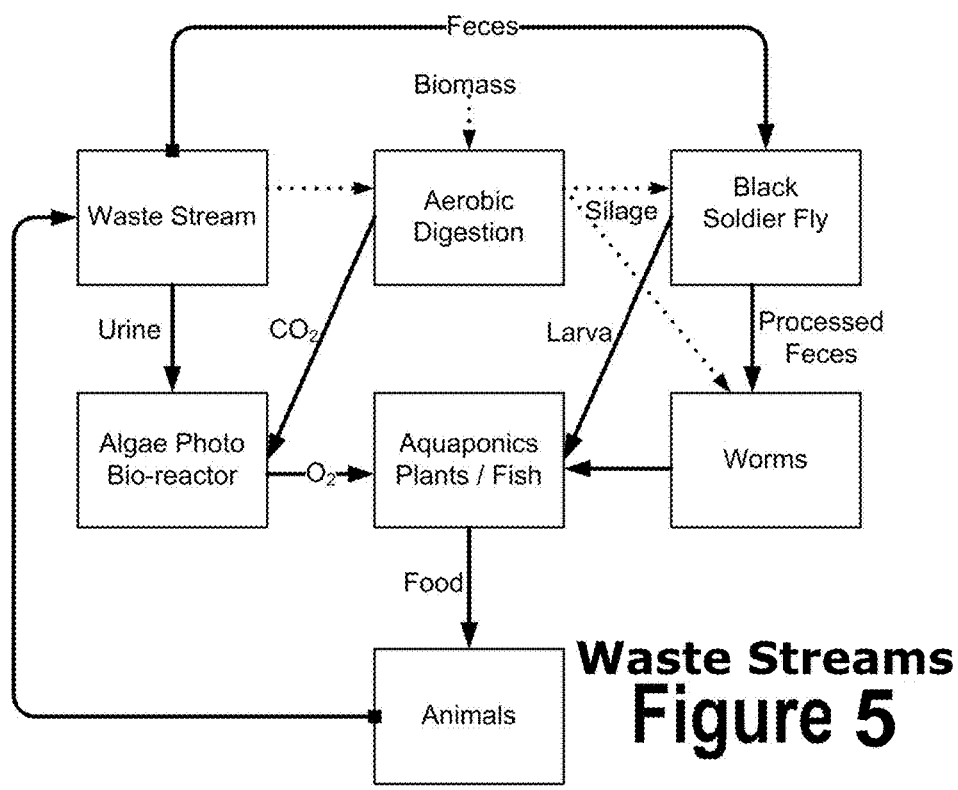
FIG. 5 is a diagram of waste of urine and feces that features catabolic and anabolic processing to ultimately create food.

An illustration of their use in the waste stream is illustrated in FIG. 5. Through the novel environmental control aspects of the exergy and resource environmental management system, an optimized environment can be created for conversion processes. The management of thermal systems promotes appropriate environmental temperatures of between 27.5° C. to 37.5° C. (81.5° F. to 99.5° F.) to promote proper development of black soldier flies. Later, after the fly larvae are harvested, the remaining medium can be further processed by worms which require a lower temperature of 15-25° C. (59-77° F.) for optimal conversion processes. In FIG. 5, the feces can be pasteurized through coupling with an aerobic digester that is thermally coupled to thermal storage. This pasteurization process can occur at any stage, including processing worms and larvae to prevent such things as parasites or $E.\ coli$ from entering the food system. The dashed lines are optional paths, such as anaerobic digestion of waste to produce methane and $CO_2$ that could be turned into biomass from the APBR. These potential cycles demonstrate the processes that can turn waste into food.

Another symbiotic catabolic process is aerobic digestion by mycelium. Mycelium shape and maintain their own atmospheric environment with between 3000-5000 ppms of $CO_2$ as they decay organic matter. Prior art has often used a mushroom mycelium production system to enhance levels of $CO_2$ in greenhouses. $CO_2$ is also essential for the proper growth of algae. While concentration levels between 3000-5000 ppms of $CO_2$ are far below being 100%, these levels are sufficient to promote the desired exponential growth stage of algae. Algae and mycelium production hence form a symbiotic process, each acting as a material cycles operator. Through a novel airflow adjustment, extraction of elevated $CO_2$ levels can be made without affecting mycelium viability. As conventional $CO_2$ inputs generally represent a significant cost in algae production, this provides a new low cost alternative.

Mycelium are an important catabolic process that performs enzymatic hydrolysis in order to convert the complex cellulose of lignocellulosic materials into simple sugars. These sugars can then be further processed by another catabolic process of anaerobic digestion, whose process creates production of silage, which can be utilized as a medium for mycelium cultivation—forming yet another symbiotic process. Mycelium can be cultivated on many types of media, preferably sterile. Sterile media production can be created by coupling to the thermally regulated pasteurization process utilizing the temperature gradients of the thermal reservoir as previously described.

The sterilization of medium for the mushroom mycelium digestion system can also be accomplished in another novel way. With proper temperature regulation, compost can become a sterilized medium ready for mycelium inoculation. At the end of the compost process, the management system adjusts thermal regulation to return the temperature of the composted medium down to an optimal 80° F. (27° C.) for mycelium inoculation. After sufficient mycelium development, the temperature of the growth medium can be decreased to approximately 60° F. (16° C.) for spawning where a casing layer is applied after which mushrooms appear and are harvested.

Figure 6:
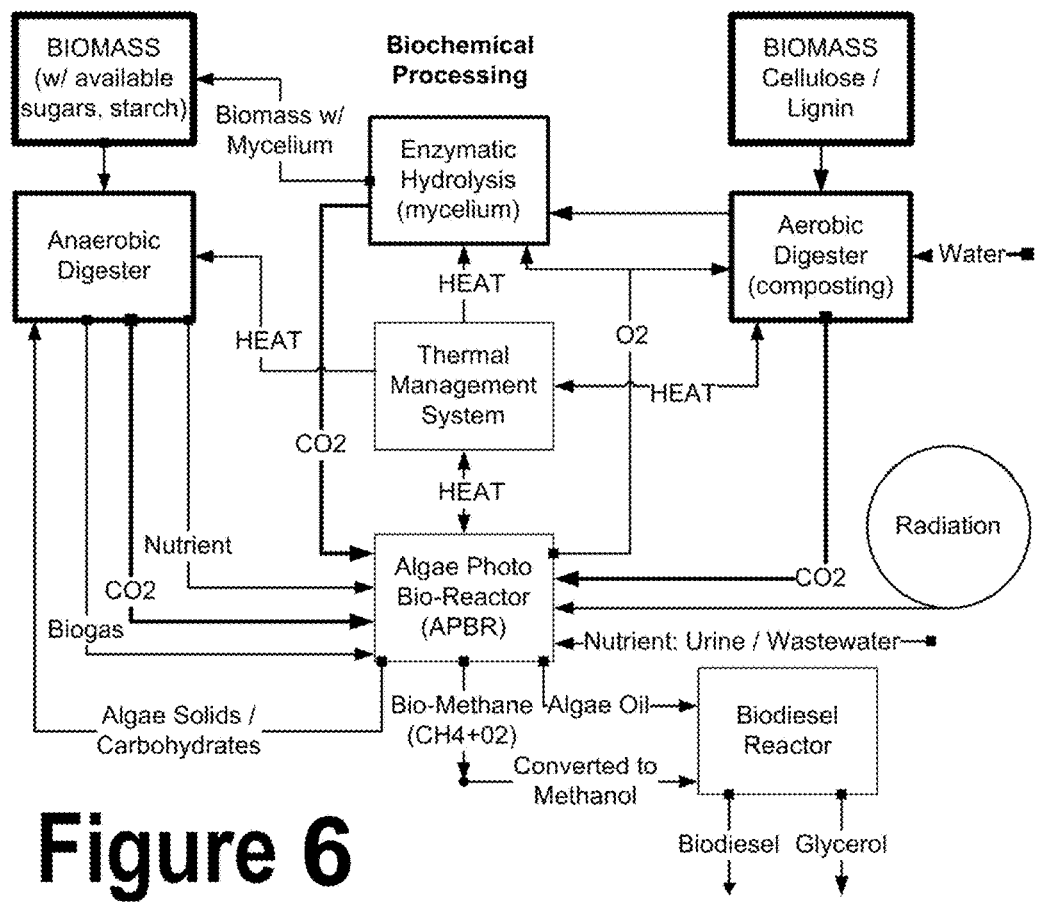
FIG. 6 illustrates an integrated biomass biochemical processing system that utilizes an algae photo-bioreactor, aerobic and anaerobic digestion, enzymatic hydrolysis from mycelium, and a biodiesel reactor.

Typical composting processes have severe limitations in their complete pasteurization of the substrate. A new way of composting, utilizing the APBR and the thermal reservoirs, consists of segregating the medium, preferably inside a properly engineered enclosed temperature controlled environment where it can be regularly turned and aerated, preferably with the $O_2$ output from an APBR. Heat from the exothermic composting process of carbon being oxidized, can be regulated by exchanges of heat with the thermal reservoirs. The thermal reservoirs can store the excess heat, while ensuring that the process does not exceed temperature constraints that would be detrimental to the aerobic bacteria (typically above 160° F. or 70° C.). When coupled with controlled inputs of aeration, oxygen concentration, water, carbon materials, and nitrogen, the composting process can be accelerated without the typical detriment of high uncontrolled temperatures. Also the gasses released, primarily carbon dioxide and ammonia, can be sent to the APBR where they are used to create additional biomass and generate oxygen to continue the oxidation process. In this way the gas, fluid, and solid handlers each create a part of a circular process that enables and even enhances other processes necessary for function. In an aerobic digester system the majority of the energy in the starting material is released as heat by oxidization into carbon dioxide and water. In contrast, in anaerobic digestion, the majority of the chemical energy contained within the starting material is released by methanogenic bacteria as methane. Anaerobic digestion also produces alcohol and many other final products depending on process stage (illustrated in FIG. 6). Biogas, a final product of methanogenesis, includes: $=CH_4$ (50-75%), $CO_2$ (25-50%), $N_2$ (0-10%), $H_2$ (0-1%), $H_2S$ (0-3%), +silanes+ siloxanes (often from soaps and detergents). Biogas can be very useful to supply energy for cooking. The methane ($CH_4$) in biogas is also useful for a variety of energy uses, but the other elements, including carbon dioxide ($CO_2$) which retards combustion, hydrogen sulfide ($H_2S$) which is corrosive, along with silanes and siloxanes that form mineral deposits, can easily destroy equipment. For this reason, it is useful to upgrade the biogas. This can be done in several ways, including using an APBR, where the algae remove these constituents, consuming $CO_2$ and $H_2S$ as nutrients and process them into high value compounds such as omega-3 and other long chain carbon compounds. In addition to the algae biomass growth, this process leaves behind primarily $CH_4$ and $O_2$ resulting in higher energy content and increased structural exergy from the initial biogas. The energy necessary for this upgrading process comes from solar and/or artificial radiation. Another benefit realized by the symbiotic combination of anabolic APBR processing with the catabolic processing of wastes (including silage/digestate/wastewater) created from anaerobic digestion is the significant reduction or elimination of the typical hazards of eutrophication/hypertophication that commonly result in hypoxia when released into outside environments.

Both anabolic and catabolic processes are essential in realizing symbiotic natures of material processing. Careful design and utilization of the processes can manage exergy destruction within the system.

Energy Systems Operation

The exergy and resource environmental management system enables the conversion of many resources into energy products through biotic processes (such as photosynthesis and anaerobic digestion/fermentation/biogas production), and abiotic processes (such as thermal energy conversions, including gasification, photovoltaic processes, harnessing of the motion of internal processes, changes in pressure, et cetera).

As has been discussed, a novel method of exergy conservation can be achieved by using a thermosiphon within a conduit flowing through a serial cascade temperature array of heat exchangers networked to thermal storage reservoirs, heat producers, and heat consumers. This system can eliminate or reduce the need for pumps.

This system can be further improved by using techniques described in U.S. Pat. No. 4,366,857 wherein the thermosiphon affect is enhanced by a sensible heat exergy carrier: "containing a magnetically susceptible liquid as the working fluid, surrounded by an electro-magnet or permanent magnet which produces a magnetic field gradient which interacts with the magnetically susceptible liquid to produce an artificial body force field analogous to, but which may be substantially greater than, the gravitational force field."

In this manner, it is possible to enhance the throughput of a thermosiphon to increase heat energy flux and associated heat exchanges within the system.

Another method to produce power is through utilizing a thermoacoustic prime mover heat engine operating as previously described in the description. A new novel method of driving the thermoacoustic prime mover heat engine is created through establishing multiple heat exchangers within the resonator and arranging the heat exchangers to create a thermosiphon flow within the resonator. The flux of heat flows through the temperature gradient thermal reservoirs can drive the convective current within the resonator in both heat input and extraction modes.

A novel arrangement of heat reservoirs is shown in FIG. 9. This layout is optimized for power generation versus environmental control. In the figure, the central conduit or structure forms a resonator and is connected to a thermoacoustic prime mover that generates sound with temperature differentials. Possible internal pathways can form a circular shape or a FIG. 8 shape where the resonator forms a bridge between the circular pathway. In the FIG. 8 design, the hottest thermal reservoir and the coolest thermal reservoir are located at the opposite sides of this central structure or conduit. Power can be generated with lower temperature levels through increasing air-pressures within the resonator chamber. This may be accomplished through liquid gas phase changes that are coupled with the cascading thermal reservoirs.

Through engineering, this design can turn diffuse environmental energy into sound and ultimately into power by transforming mechanical vibrations into power.

Another method of power production is rooted in the past—the harnessing of the kinetic energy of domestic animals to do work. Other processes that generate power are based upon biochemical, thermochemical, and catalytic reactions of biomass as previously discussed. As conversion of biomass directly into energy results in exergy destruction of valuable compounds such as long chain carbon compounds, it is advised that catabolic energy producing processes utilize low-value biomass that contains contaminants.

Likewise, another new and novel potential embodiment for harnessing the flux of heat energy utilizes the pressure differences in phase change to capture potential energy, such as when a liquid changes phase and expands into a gas. For instance, as water changes phase into steam at 100° C., its volume expands 1700 times the initial volume. Likewise, as steam condenses into water, its volume inversely changes. Volume change is commonly used to turn a turbine and produce electricity. Other possible conversion apparatus for harnessing this volume change include pneumatic motors.

By utilizing phase change materials of differing transformation temperatures, it is possible to arrange them in a temperature gradient so that heat energy flux through the system can be used for the creation of pressure differentials that may then be harnessed to enable gas concentrators, gas processors, gas distributors, and the production of energy and work. Typically to create a phase change a large expenditure of energy is necessary. But when the isothermal temperature point is closely bounded above and below, the change in system exergy is minimized as illustrated in the first two examples of the thermal management operations. By using the concept of exergy to analyze flows of energy throughout the system, it is possible to create a steady-state far-from-equilibrium dissipative structure that functions entirely off renewable diffuse energy flows.

Management Systems Operation

In reviewing the many processes internal to the exergy and resource environmental management system, most benefit from management of attributes such as temperature levels, atmospheric and material processing (including segregation), and radiation levels. By managing all of these components within a single system bounded by changing external environmental conditions, it becomes possible to manage exchanges of energy or mass over time to provide a homeostatic regulator that allows organisms and chemical processes to function effectively.

Through flows of information, the information processing management system can categorize, segregate, and condition materials based upon exergy. Internal processes can be operated in optimized ways (such as creating ideal recipes for composting, fermentation, and biochar, or operating symbiotic processes such as a catabolic aerobic digestion oxygenated by an APBR that takes $CO_2$ inputs from the aerobic process). Information allows for classification of biomass in relation to attributes such as structure, nitrogen, carbon, sugars, fats, proteins, acids, et cetera. Bioinformatics, the study of information processing in biotic systems, can be employed to extract useful results from large amounts of data through computational biology. Information such as reaction fluxes, cellular signalling, varying metabolite concentration levels, structures (i.e. peptides, proteins, nucleic acids, lignands), can be utilized in subsequent biomass processing. Through studying the bioenergetics of the system, namely the endergonic and exergonic reactions, it becomes possible to understand the role energy plays within the biotic processes.

With information indicating the availability, quantities, and qualities of matter and energy, it becomes possible to model the behavior of exergy flows through the system. Bioinformatic analysis of integrated biotic systems can be applied to determine the best combination of energy and resources taking into account situational goals. Variability in resource environment and energy can be accommodated by engineering the entire system on the basis of meeting environmental requirements concurrently. In biotic systems, conformer organisms adapt to the system's environment while regulator organisms must be accommodated by the system through appropriate environmental regulation. Through homeostatic regulation, organisms and chemical processes function effectively over a broad range of changing environmental conditions. Homeostatic regulation is accomplished through managed exchanges of energy or mass over time or simply through diffusion.

Control mechanisms manage these exchanges typically by utilizing a feedback process with at least three components for the variable being regulated: receptors/sensors that monitor conditions and communicate changes to a control center that regulates system parameters and determines appropriate responses—sending either a positive or negative feedback signal sent to the actuators (effectors in reference to biological processes).

Aspects for consideration to maintain environmental regulation may include the temperatures, pressures, qualities, quantities, and their associated enthalpies in relation with:

Historical data, microclimate data, meteorological data, climatology data, atmospheric science data, hydrology data, comparative data, profile databases, system events, tasks, processes, intervals, operation modus, schedules, administration and user input, differential calorimetric analysis.

Equipment for consideration may include such items as:

Air handling unit, heat pump, auxiliary heater, furnace, boiler, absorber, condenser, absorption chiller, ducts, louvers, blower, pump, valves, motor, filter, generator/desorber, evaporator, cooling tower, collectors, thermocouple, bio-chip/bio-sensor, transducer, desiccators, proportional valve/3-way/4-way/etc, actuators, flow meter, check valve, regulators, thermostat, infrared pyrameter, methane generator, alarms, and storage reservoirs.

Sensors for consideration may measure such items as:

Internal/external temperatures, pressures, flow rates, external inputs, velocities, louver openings, radiant heat, humidification, material concentrations and levels, quality, bio-chemical reactions, voltage, radiation levels, et cetera.

Environmental variables that may be measured, displayed, and analyzed to make decisions for resource utilization within the system may include:

External Environment:

Temperature, wind, rain, radiation, energy, pressure, mass, geospatial data

System Output:

Heating, cooling, air quality, water quality, effluent, biomass, electricity, gasses: $O_2/CO_2/NO_x/SO_x/H/C/CH_4$, data Energy Sources:

Active and passive solar, external sources of temperature/pressure differential (air/wind, geothermal, water), biomass, biogas/methane, $H_2$, fossil fuel reserves, nuclear, coupled flows of energy including sources such as grid-power In one embodiment, a graphical user interface presents information about system environmental components which users may access, interact, manage, and customize. The interface may include summary information for the spaces, equipment, and processes in communication with the environment and take on the form of a two, three or four dimensional (X, Y, Z, time) model(s) representing managed systems. This interface may take the form of searchable/navigable lists, with managed users and processes. Visual indicators may be integrated into the structure of the system, such as above doorways, along pathways, and in public spaces. In addition, they may consist of biological indicators, such as biomass or organisms that change in color, size, health, et cetera, in response to system processes.

In another potential embodiment, positive feedback mechanisms regulate output or activity in response to changing environmental conditions in order to alter levels outside of standard ranges, often utilizing a cascading process of addition. Negative feedback mechanisms enable the regulation of the output or activity within a set and narrow range of functioning typically through restriction. Both feedbacks are equally important for proper system functioning.

An illustrative example of the importance of feedback is an embodiment with thermal inertia consisting of a large building mass that will react slowly to changes in heating/cooling demands. Use of local weather forecasts as well as environmental monitoring data can help optimize efficiency and system output by proactive management systems rather than reactive control. This may use the predictor-corrector algorithm for regulation.

Another example of a predictor-corrector algorithm being applied to system regulation involves a herd of dairy cows that are allowed to graze over a wide range. Each individual could be outfitted with a GPS tracking device so that their grazing paths are captured. When their milk is taken, the qualities of the milk can be compared to the geospatial paths that different cows took. Cows often ingest many things in their environment, such as wild onions or garlic, for instance, that can dramatically affect the taste and odor profile of the milk. Through comparative analysis of the data from different animals that grazed in different areas, certain environmental aspects can be revealed. Through this data discovery process, changes to the environment can be made (such as fencing) to exclude the cattle from undesirable grazing areas.

Another example of the supervisory management system in consideration of event/time/structural exergy is capturing a profile of an individual's (person, animal, et cetera) diet (noting potential toxins and nutrients), in order to determine the structural exergy of specific urination/defecation events. This can then be compared against actual events through analysis of differing levels of physical aspects such as: mineral concentrations (such as sodium, potassium, iron and magnesium), as well as dissolved chlorine, nitrogen based chemicals, sugar, protein, and hormones. A continuation of this concept is exemplified by tracking individual's unique cycles (such as sleep, menstruation, fertility, pregnancy), tracking events in relation to time, possibly performing physical as well as data analysis, and supplying feedback information regarding times of ovulation/pregnancy potential, when produced milk may not be suitable for ingestion or is of particular benefit (i.e. colostrum), risk for diabetes, kidney disease, risk of blood clots, risk of brain deterioration, et cetera.

Decentralized management, independent of the central management system, is also possible. Devolved autonomous processes performing the function of an atmospheric management system, a hydrological cycles management system, a manager of energy and mass exchanges over time, and even a simple diffusion processor, can be realized through proper system design.

The individual embodiments featured in FIGS. 10 and 11 enable material processing cycles on smaller scales. The structural exergy of products from these cycles can be dependent upon decisions made by system users to create a self-reinforcing loop. An example of such a loop occurs when a user decides not to segregate waste streams, such as urine, containing contaminants, such as pharmaceuticals. These contaminants would enter into the individual user's food supply forming a direct consequence in response to the user's action. With certain pharmaceuticals or nutraceuticals, this may actually be preferable and enhance bioaccumulation as well as bioavailability of such substances. These affects results in another novel aspect—material cycles can biomagnify, bioconcentrate, as well as biodilute substances by utilizing source segregation of waste streams that feed inputs to anabolic processes.

Another new novel potential embodiment involves managing the temperature and gas exchange between the previously mentioned system processes such as managing the compost temperature cycles to provide pasteurization of silage and subsequently provide optimal conditions for mycelium growth and fruiting. Likewise the management system can manage the utilization of pressure differentials created by phase change materials in order to perform work, for example, the pumping of water (possibly through the air-lift method) and the concentration of gas ratios using pressure swing adsorption. These actions are accomplished, as previously mentioned, through positive and negative feedback mechanisms, possibly in conjunction with a predictor-corrector control algorithm for regulation.

Another novel use for the management system algorithm include being able to regulate the air and water temperatures for plants and fish. In one embodiment, the temperature of water within a fish tank is managed at a different level than that exposed to plant roots fed by that same water. This provides a critical feature currently lacking from current aquaponic systems. The temperature of the fish tank is highly dependent on the variety of fish, many of which go into hibernation at lower temperature levels. Unfortunately, many plants require lower temperature water to produce desired results, for instance lettuce bolts, forming flowers and seeds, imparting bitterness to the plant when exposed to high temperatures. The management system could adjust processes through cascading processes of addition (adding heat) or the removal of heat, to maximize exergy. Likewise, the management system can manage temperatures of the air stream flowing through the root structure of plants to provide optimal thermal conditions.

In addition, novel methods of visual feedback become possible with an autopoietic ecosystem. Biological indicators can visually illustrate living organisms signs of wellness or lack thereof, and/or produce visible feedback through the alteration of chemical processes, and/or distribute particular olfactory scents for feedback (such as sulfur), and/or alter physical structures and properties (such as color, volume, or altitude), all in response to monitored systems. These indicators can also help manage increases in system entropy and help segregate material streams based upon input quality and content.

A embodiment that showcases the novelty of the management system would utilize a multitude of sensors such as LIDAR scanners, automated drones with field sensors, cameras, and humidity sensors, communicating using the modulation of light in a LiFi-network. The communication system can use a floating methane storage balloon that relays the information of monitored conditions to a control center that regulates system parameters and determines appropriate responses and then sends feedback signals to actuators or effectors.

Another novel embodiment of the management system controls aspects of transport within the building structure including directing vacuum air delivery services for material transport (similar to those used at bank ATMs), operating navigation controls for mass transit, and doors and portals to segregate sensitive areas and processes. More of the uses of the management system will become apparent by looking at the building systems operation.

With proper system management, anabolic processes (production) can exceed catabolic processes (degradation and dissipation) resulting in entropic decay and increasing biomass, species proliferation, increased complexity, and increased stocks of available energy and matter.

Building Systems Operation

All nature is a continuum. The endless complexity of life is organized into patterns which repeat themselves—theme and variations—at each level of system. As such, the buildings have multiple subgroups performing in parallel offering opportunities for diversity as well as ensuring that system failures do not destabilize the system's steady state operation. An example of this is the embodiments illustrated in FIGS. 10 and 11 showing an individual unit. This unit features two APBRs, an aquaponic setup, multiple thermal reservoirs (which include the fish tank(s)), and a conduit consisting of a staircase for convective air flows. As examined earlier, the APBRs can be fed from $CO_2$ from mycelium, and aerobic and anaerobic digestion, along with urine, silage, and other wastewater as a nutrient source. The growth of mycelium in these individual units can also serve to create mycelium mats that can act as biological filters (bio-filters), reducing or eliminating such substances as *E. coli*, offering an additional option for waste remediation.

When considered together, the individual processes form redundant systems that can be tailored to individual users. The exergy flows from these micro-ecosystems can be integrated with the surrounding macro-ecosystem just as bioregional ecosystems fade into one another naturally.

Many of the structure's operational aspects have been described previously. It is through the structural linkage of systems that multiple functions are provided. Glazing may double as collector surfaces for rainwater harvesting, angled surfaces may function for solar collection/concentration, towers for living space may double as solar concentration towers, awnings for shade may provide space for biomass growth, and linked pathways may serve as transportation networks for people, utilities, and material transport.

One important aspect that has not yet been discussed in depth is the various modes of transport within the structure and with the surrounding environment. Many modes of transport are necessary for proper system functioning. The transmittal of data is paramount for proper functioning of ecosystems. When applying this principle to built systems, data can be transmitted in various ways such as energy and material transfer. Data can also be transmitted through conventional electronic communication networks. The discussion and implications of radio frequency on biological processes has been discussed previously in the radiation section above along with suggested designs to minimize RF exposure. Through the connected nature of the building design, it is possible to create and modulate light pipes for the transmittal of data. The hexagonal building design facilitates utilizing light pipes with straight paths and set angles allowing use of mirrors for direction changes.

The connected nature of the building design also allows for material transport pathways. As illustrated in FIG. 12, these pathways can utilize basements as well as roof structures to form pathways. FIG. 12 shows four interior levels. The bottom basement level shows a roadway that could be used for rail transport or zero-emission electric vehicles such as golf-carts. The first and second stories are composed of greenhouse production/dwelling units. To the rear of the greenhouse structures are thermal reservoirs that could also be used as connected waterways for delivery of materials such as live plants with ripened fruit to areas of purchase and consumption. These same waterways may also transport nutrient flows that could be used to maintain these same plants.

The third above ground floor in FIG. 12 is an internal pathway connection that could service walking and lighter vehicles such as bikes, electric scooters, Segway PTs. The roof also forms another pathway for these modes of transport. By having multiple levels, it becomes possible to segregate the directional flow of traffic and increase throughput. Efficient utilization of floor space for traffic flow may be useful when combined with on-location production/sales activities of biomass that also occupies the third level. By having food production alongside pathways, residents could see what is available and shop for food along their journey.

Another element of the design is the connection points at the vertices of the hexagonal design. This can be seen in FIG. 15. These ramp-ways would ideally be ADA handicap compliant and allow for easy transitions between levels. This allows for handicap accessibility necessary for the disabled and those in their later life-stages. The ramp-ways also allow for easy and quick routing of traffic through the building without relying on mechanical devices such as elevators. Another transportation element illustrated in FIG. 12 includes the three staircase/tower assemblies that also function as solar chimneys. With this structure, it is possible to connect a personal rapid transit system, such as the Shweeb light monorail system. It is also possible to connect tethers such as those illustrated in FIG. 14. These allow for harvesting of biomass, such as fruit, from the courtyards that feature food forests—reducing or eliminating the need for ladders. These same lines could also be used to hang netting to provide shade or exclude birds, etc.

Another important element for transport is the use of a pneumatic tube transport system, similar to those used for drive-up banking. The connected nature of the building makes it easy for these systems to connect the various units and offer a convenient and energy efficient method for material transport through the system. This system may be of particular benefit when operated with the time/event/sub-event material handling system. This enables 'packets' of material to be delivered throughout the system for subsequent processing, analysis, storage, and utilization. Another benefit of the connected structures is the ease of running utilities throughout the structure. Utilities typically include lines for light distribution (light pipes/fiber optics), wired power and communications, biogas, hydrogen, and methane (i.e. upgraded biogas), water, and other gas and fluid supply lines.

Transport options can be thought of in zones depending on journey distance: walking, Segway PT (personal transport), horseback riding, cycling, scooters, personal rapid transit, electric golf-carts, automobiles, busses, trains, evacuated tube transport, air travel, space travel. Basing transit decisions based upon this principle can lower users' energy use.

Other design elements include the greenhouse above the north/south connector buildings. This greenhouse serves as a thermal buffer zone with the structure below. These north/south buildings would typically serve as offices, laboratories, classrooms, shops, and repair and production facilities. The design of the greenhouse on the roof is part of the goal to utilize solar energy as much as possible in the structures. Ideally no roof would be without vegetation. The greenhouse design allows light to filter into the building below while offering a linear aquaponics floating raft production system, where seeds are planted on one side and reach maturity on the other. This allows for food processing steps (such as washing, dunk tanks, and refrigeration) to be located at the end of the production process, reducing required labor. This is similar to that designed by Friendly Aquaponics (www.friendlyaquaponics.com).

Located at the opposite side of the north/south connector buildings is a tower structure. Ideally this mid-rise building would be of equivalent height to the tallest trees so as to not adversely shade the courtyards. This type of building is intended for those individuals who have physical difficulties and are perhaps older and are unable to maintain personal anabolic and catabolic systems—individuals without adequate time or interest may also choose this building type. Another design element is the amount of courtyard space per person. This design illustrates a tenth an acre per person density. This amount of space can be adjusted both up and down depending on available time. It is possible to produce sufficient foodstuffs for sustenance with as little as a twentieth an acre per person when combined with the illustrated internal climate controlled production processes. It is an operation goal that production processes provide a surplus for both residents and the greater community so courtyards a tenth an acre per person or greater is advised. The size is primarily limited by available labor to properly steward these areas.

Another aspect to be considered is properly locating these structures in existing ecosystems. Ideally they would be located in areas of moderate elevation change (preferably not entirely flat), in close proximity to natural hydrological flows, and along transitional ecosystem edges (where one type of ecosystem meets another such as forest/grassland). FIG. 16 shows a potential arrangement of this system, a design expanded beyond the illustrated design of 13. This is a preferred embodiment that features two extended courtyards (to the right and left) that are fully enclosed by the structures along with five distinct structures that enclose ten courtyards. Four of these structures form a 'C' shape arrangement. The open courtyard formed between the union of the C-shaped structures could feature a corral for domestic animals such as cows, goats, sheep, etc. These animals could then be herded to the outside environment through the corridor between the structures. Another use for this corral is to provide additional habitat for wildlife without confinement. In addition to these structures is the smallest building complex comprised of the two courtyards located directly in the center. These are flanked by very narrow corridors that function as wildlife corridors when combined with properly managed native ecosystems in the C-shaped courtyards. This provides a interface between internally managed systems and the greater environment for wildlife viewing. The lines connecting all structures together (shown passing through the hexagonal courtyards) represent a personal transit system.

The construction of these structures would ideally use locally available resources. Preferred materials would be designed for longevity. When considering the internal biotic processes that may often operate with humidity levels of 80% or greater, the use of organic materials is not advised. When looking at concrete, it is typically based upon Portland cement, a product that has a typical lifespan of less than 150 years. The production of Portland cement also releases great quantities of $CO_2$ in its production (which could, through use of these systems, be sequestered to produce biomass and storage and utilization of waste heat). Conventional reinforced concrete utilizes steel rebar. Over time water intrusion rusts the steel, expands, and damages the reinforced concrete. Instead of using steel rebar, basalt rebar is suggested as it does not suffer from issues of rust. Due to the many issues using Portland cement, it is recommended that construction use materials such as lime (which can be regenerated and reused after its estimate 300+ year lifespan), and magnesium phosphate cements. The preparation of lime based concrete can also be accomplished coupled to this system to accommodate $CO_2$ sequestration and utilization of waste heat. Ideally, lime would be mixed with a pozzolan, possibly including bag-house dust from glass recycling, to make a mortar.

Other materials can be used other than lime mortars. The optimal material is magnesium phosphate cement for longevity. The pantheon in Rome is almost 2000 years old and used such a material. Unfortunately this cement is currently priced approximately five times higher than Portland cement. To address this issue while still providing an economical finished structure, judicious use of the material is suggested. Considering the qualities of magnesium phosphate cement, the high strength combined with its affinity to adhere to organic materials, a possible technique to minimize its use would be to use thin-shell concrete techniques in combination with tension fabric building design. By using materials such as canvas or burlap, it is possible to apply a very light coating of this cement on these membranes so that once hardened (in less than an hour), the substrate can then be used to build a thin-shell, preferably 1.5 inches (3.8 cm) thick as this allows sufficient coverage (0.5 inches/1.3 cm) over half inch (1.3 cm) reinforcing basalt rebar. The reduction in coverage depth of rebar is due to its ability to handle water intrusion without corrosion and subsequent expansion. This thin shell structure would then be preferentially insulated by aerated cements similar to Airkrete™. When creating structures using lime mortars in the form of concrete masonry units (CMUs), insulation can also be accomplished by using autoclaved aerated concrete of appropriate mixtures. Additional reasons for these material selections include the fact that Portland cement is always seeking an electron from the environment due to its preparation at extremely high temperatures. Both lime and magnesium phosphate cement do not share this and have been found to be preferable by living organisms (such as cows preference to stand on lime and magnesium phosphate cements versus standing on concrete containing Portland cement). In addition, magnesium based cements are bio-compatible and used in dental and medical fields (as a bone cement).

Other material choices would be very conventional in nature, preferably referring to the RED list put out by the Living Future Institute (www.living-future.org) to avoid the use of toxic materials. Non-traditional building products not mentioned could include rammed earth tires (as used in EarthShip construction), adobe, and earthbags.

Building constructions techniques could also employ the use of contour crafting (3D printing) of cement materials, as well as dry-stack concrete masonry units (CMUs), rubble trench foundations (when no basement is desired), and earth auger based foundations. Wherever possible, utilization of on-site resources, such as trees displaced from the building site, should be reused as much as possible, such as for the creation of concrete form-work.

The autopoietic concept involves self-creation. With the additional energy products produced by the system, it is possible to create and process exergy reserves to form the actual structures of the exergy and resource environmental management system. In addition, many of the material production requirements benefit from environmental management (such as anabolic processes and thermal storage for cement production). Through the totality of the systems herein disclosed, it is for the first time possible to create a dissipative structure capable of all aspects of environmental control utilizing energy flows solely supplied from the coupled natural environment.

Description and Operation of Alternative Embodiments PPA

Alternative embodiments include:
 Solar radiation concentrating APBRs that thermally couple to the management system to prevent overheating Domestic animal production—using the concepts of segregating sick animals from healthy individuals, creating environments within segregated structures to perform similar functions.

Cryogenic distillation techniques of gas separation, using for instance, thermoacoustic refrigeration Wellness Center:
Hospital/Spa/Gym/Birthing Center/Nutrition Center/Apothecary/Juice Bar/Oxygen Bar
Entertainment/Food/Lodging/Ecotourism/Agra-tourism Complex Housing for family, youth, vacation, luxury, hostel, multi-families, and/or farm-workers
Local agriculture interface/food web/food processor/farmer's market/CSA depot
Aquaculture/Aquarium
Education/Research facilities/Ecological Studies/Conference Center
Religious Monasteries
Laboratory/Biorefinery/Brewery
Producer: Energy/Biorefinery/Cosmetics/Nutraceuticals/Health-Personal Care Products/Biomass/Biogass/Syngas/Bio-based plastics/chemicals
Wastewater Treatment Facility
Mushroom production facility

CONCLUSION, RAMIFICATIONS, AND SCOPE

Thus the reader will see that at least one embodiment provides resource conservation, a safer/healthier environment, ease of use, increased reliability, durability, and resilience, with increased life cycles, upgradeability, convenience, social enhancement, ecological benefits, affordability, pollution reduction, enlarged market versus pure research systems, while offering choices of quality through efficient decentralized processes of cascading flows of matter and energy. Integration enables biomass processing and consumption nearer the place of production. This creates shorter cycles (water, minerals, and residual flows), reduces storage and transportation flow requirements, produces higher value products, and distributes labor throughout the year.

While description above contains many specificities, these should not be construed as limitations on the scope, but rather as an exemplification of situationally optimized embodiments thereof. Many other variations are possible. For example abiotic chemical processing that is advantageously moderated through the use of pressure, temperature, radiation, or other interactions that this system enables. Accordingly, the scope should be determined not by the embodiment(s) illustrated, but by the appended claims and their legal equivalents.

What is claimed is:
1. A method for optimizing exergy within a dissipative structure, the method comprising:
providing a thermal management system comprising thermal flux and reservoirs, conditioning an exergy carrier;
providing an atmospheric management system comprising gas, processing gas distribution, gas concentration, driving of exergy carriers past active agents, filtration operations, conversion and concentration of substances from the group of molecular, particulates, volatile organic compounds;
controlling radiation processes, comprising direct and concentrated light, and optimizing solar and artificial radiation usage;
managing hydrological cycles comprising structural exergy, utilization and remediation, temporal cycles and events;
utilizing material cycles operation wherein material cycles comprising anabolic and catabolic processing, algae photo bioreactor (APBR), aquaponics, biochemical, catalytic, and thermo-chemical processing, nitrogen and carbon cycles, source segregation;
providing an energy system prime mover comprising thermal flux heat energy through the system, the creation of pressure differentials;
providing a supervisory management system comprising managing exchanges of energy and mass over time, by diffusion, and by information processing for managing exergy flows; and
utilizing a building system comprising the homeostatic regulation of cascading flows of matter and energy, managing exchanges of energy and mass over time, simple diffusion, microclimates, concentrating solar energy, storing mass, transporting mass.

2. The method of claim 1, wherein thermal reservoirs comprising a plurality of reservoirs each with an assigned temperature range for storing thermal exergy whose temperature gradients are associated with heat sources and sinks.

3. The method of claim 1, wherein thermal reservoirs comprising thermal storage materials from the group of sensible, latent.

4. The method of claim 1, wherein gas processing comprising molecular sieves whose materials are from the group of active carbon, Zeolite provide the steps of absorption, enrichment, separation from an air stream of the gases from the group of $CO_2$, $SO_2$, oxygen, nitrogen.

5. The method of claim 1, wherein gas processing comprising photo-catalysts and catalytic hydrophilic surfaces decompose organic materials selected from the group consisting of titanium dioxide $TiO_2$, organic, metallic.

6. The method of claim 1, wherein driving of exergy carriers past active agents comprising a convective fluid loop that flows said exergy carriers past active agents from the group of catalysts, bacteria, microbes, autotrophs.

7. The method of claim 1, wherein filtration operations comprising convective effects, thermosiphon effects, managed by the supervisory management system.

8. The method of claim 1, wherein converting substances comprising catalysts from the group of catalysts, bacteria, autotrophs, microbes convert substances from the group of nitrogen oxide, sulfur dioxide into said substances elemental components comprising the group of nitrogen, sulfur, oxygen.

9. The method of claim 1, wherein the direct and concentrated light structures comprising said structures from the group consisting of building towers, staircases, solar chimneys, fixed and tracking reflective surfaces, beam steering adjustable focal points, hexagonal building design.

10. The method of claim 1, wherein optimizing radiation usage the first step utilizes hexagonal building design and by the second step of utilizing light control technologies from the group of louvers, shutters, photochromic, thermochromic, electrochromic, photoelectrochromic technologies, retractable shade netting.

11. The method of claim 1, wherein managing hydrological cycles comprising structural exergy and temporal events, time and event register, inputs of water, and segregation of said water into storage reservoirs and fluid processing.

12. The method of claim 11, wherein inputs of water at a particular event comprising the first step of determining the quality of water so that said water can be segregated, an optional second step where said water is combined with other water, and by a third step comprising real-time, or near-real-time, testing and analysis of said water utilizing data from the group of pollution indexes, pesticide application industrial events, direct user intervention.

13. The method of claim 12, wherein said testing and analysis utilize predictive analysis of said data.

14. The method of claim 1, wherein managing hydrological cycles comprising capturing and storing the structural exergy of precipitation.

15. The method of claim 1, wherein dehumidification comprising the utilization of a desiccant from the group of Zeolite.

16. The method of claim 15, wherein a desiccant recharging first step is where the desiccant is incrementally brought up to temperature using the temperature gradients of the thermal storage system, the second step wherein contained water changes phase into steam, the third step wherein said steam released and subsequently condensed into water through various heat exchanges, and the fourth step recapturing heat energy.

17. The method of claim 1, wherein source segregation comprising multiple drains for segregation of urine, common contaminants from the group consisting of fluoride, petro-chemicals.

18. The method of claim 17, wherein multiple drains comprising distinct processing system optimized for a particular contaminant from the group of toothpaste, cosmetics, lotions.

19. The method of claim 1, wherein algae photo bioreactor (APBR) comprising photosynthesis utilizing radiation from the group of solar, artificial, wherein said photosynthesis provides oxidation for material cycles, and biomass production.

20. The method of claim 1, wherein algae photo bioreactor (APBR) utilizes enriched $CO_2$ material obtained from Mycelium.

21. The method of claim 20, wherein Mycelium production comprising cultivation on sterile media, wherein said sterile media production comprising preferably silage from anaerobic digestion.

22. The method of claim 21, wherein sterile media production comprising a thermally regulated pasteurization process through controlled inputs of $O_2$ from the algae photo bioreactor (APBR).

23. The method of claim 1, wherein thermo-chemical processing comprising gasification pyrolysis depolymerization production of the group of synthesis gas, pyrolytic oil, bio-char.

24. The system of claim 1, wherein catalytic processing comprising pyrolysis depolymerization producing synthesis gas from the group of biomass.

25. The method of claim 1, wherein the prime mover from the group of thermoelectric power generator, thermo-acoustic prime mover, Rankine, Carnot, Diesel systems is operated by thermal flux heat energy.

26. The method of claim 1, wherein pressure differentials comprising harnessing the flux of heat energy in a phase change when a liquid changes phase and expands into a gas, or the reciprocal, thereby operating said prime mover.

27. The method of claim 1, wherein supervisory management system comprising exergy, resource environment, and information processing management.

28. The method of claim 1, wherein building system for the homeostatic regulation of cascading flows of matter and energy comprising the first step of managing building exchanges of energy and mass from the group of simple diffusion, microclimates, solar energy, storing mass, transporting mass wherein utilizing building structures from the group of direct and concentrated light structures, building towers, staircases, solar chimneys, fixed and tracking reflective surfaces, beam steering adjustable focal points, hexagonal building design, and by the second step of utilizing light control technologies from the group of louvers, shutters, photochromic, thermochromic, electrochromic, photoelectrochromic technologies, retractable shade netting.

29. A system for optimizing exergy within a dissipative structure, the system comprises:
　a thermal management system comprises thermal flux reservoirs in communication with exergy carriers;
　an atmospheric management system comprising gas processors, gas distributors, gas concentrators, exergy carrier movers [pumps], active agents and filters comprises convertors and concentrators of substances from the group of molecular, particulates, volatile organic compounds;
　a radiation processes controller, optimizing solar and artificial radiation usage of direct and concentrated light;
　a hydrological cycles management system comprises gas, fluid, and solid handlers, temporal cycles and events controllers;
　a material cycles operator wherein material cycles comprises anabolic and catabolic processing, algae photo bioreactor (APBR), aquaponics system, biochemical and thermo-chemical processing, catalytic, nitrogen and carbon cycles, source segregation;
　an energy system prime mover comprises thermal flux heat energy through the system, and the creation of pressure differentials;
　a supervisory management system comprises management of exchanges of energy and mass over time, by diffusion, and by information processing for managing exergy flows;
　and a building system comprising the homeostatic regulator of cascading flows of matter and energy, manager of energy and mass exchanges over time, simple diffusion processor, microclimate zones, solar energy concentrators, mass storage, mass transportation.

30. The system of claim 29, wherein thermal reservoirs comprises a plurality of reservoirs each with an assigned temperature range for storing thermal exergy whose temperature gradients are in communication with heat sources and sinks.

31. The system of claim 29, wherein thermal reservoirs contain thermal storage material type from the group of sensible, latent.

32. The system of claim 29, wherein gas processors comprise molecular sieves whose materials are from the group of active carbon, Zeolite process gas in the steps of absorption, enrichment, and separation wherein the gases are $CO_2$, $SO_2$, oxygen, nitrogen.

33. The system of claim 29, wherein gas processors comprises photo-catalysts and catalytic hydrophilic surfaces selected from the catalytic group consisting of titanium dioxide $TiO_2$, organic, metallic.

34. The system of claim 29, wherein exergy carrier movers [pumps] comprising a convective fluid loop that flows said exergy carriers past active agents from the group of catalysts, bacteria, microbes, autotrophs.

35. The system of claim 29, wherein filters comprise a convective fluid loop that flows said exergy carriers past said active agents.

36. The system of claim 29, wherein convertors and concentrators of substances comprise catalysts from the group of catalysts, bacteria, autotrophs, microbes wherein said convertors and concentrators of substances from the group of nitrogen oxide, sulfur dioxide into said substances elemental components comprising the group of nitrogen, sulfur, oxygen.

37. The system of claim 29, wherein the direct and concentrated light structures comprises structures from the group consisting of building towers, staircases, solar chimneys, fixed and tracking reflective surfaces, beam steering adjustable focal points, hexagonal building design.

38. The system of claim 29, wherein optimizing radiation usage is in communication with hexagonal building and light control technologies from the group of louvers, shutters, photochromic, thermochromic, electrochromic, photoelectrochromic technologies, retractable shade netting.

39. The system of claim 29, wherein managing hydrological cycles comprises segregation of water into storage reservoirs, fluid processing, and manage events comprising inputs of water, structural exergy, temporal, and registers of time and events.

40. The system of claim 39, wherein inputs of water at a particular event comprises determining the quality of water, segregation of said water, combining said water with other water of similar quality, and by a manager for real-time, or near-real-time, testing and analysis of water utilizing data from the group of pollution indexes, pesticide application industrial events, direct user intervention.

41. The method of claim 40, wherein testing and analysis comprise predictive analysis of said data.

42. The system of claim 29, wherein managing hydrological cycles comprises capturing and storing the structural exergy of precipitation.

43. The system of claim 29, wherein dehumidification comprises a desiccant from the group of Zeolite.

44. The system of claim 43, wherein desiccant is recharged wherein said desiccant is in communication with a thermal storage system selected from a plurality of thermal storage systems by its temperature wherein said desiccant is incrementally brought up to temperature of the selected thermal storage system, the contained water changes phase into steam, said steam is released and subsequently condensed into water through various heat exchanges, and heat energy recapture.

45. The system of claim 29, wherein source segregation comprises multiple drains for segregation of urine, common contaminants from the group consisting of fluoride, petrochemicals.

46. The system of claim 45, wherein multiple drains comprise distinct processing system optimized for a particular contaminant from the group of toothpaste, cosmetics, lotions.

47. The system of claim 29, wherein an algae photo bioreactor (APBR) comprises photosynthesis within said algae photo bioreactor (APBR) is in communication with radiation from the group of solar, artificial, wherein said photosynthesis provides oxidation for material cycles, and biomass production.

48. The system of claim 29, wherein an algae photo bioreactor (APBR) receive enriched $CO_2$ material obtained from Mycelium.

49. The system of claim 48, wherein Mycelium cultivation comprises an aerobic digester and sterile media, wherein said sterile media's production utilizes a second aerobic digester.

50. The system of claim 49, wherein sterile media production comprises a thermally regulated pasteurization process through controlled inputs of $O_2$ from the algae photo bioreactor (APBR).

51. The system of claim 29, wherein thermo-chemical processing comprises gasification pyrolysis depolymerization production of synthesis gas from the group of, pyrolytic oil, bio-char.

52. The system of claim 29, wherein catalytic processing comprises pyrolysis depolymerization production synthesis gas from the group of biomass.

53. The system of claim 29, wherein the prime mover is selected from the group of thermoelectric power generator, thermo-acoustic prime mover, Rankine, Carnot, Diesel, communicating with thermal flux heat energy.

54. The system of claim 29, wherein pressure differentials comprises harnessing the flux of heat energy in a phase change system, wherein said phase change expands liquid into a gas, or the reciprocal, thereby operating said prime mover.

55. The system of claim 29, wherein supervisory management system comprises a management system for exergy, resource environment, and information processing management.

56. The system of claim 29, wherein the homeostatic regulator of cascading flows of matter and energy comprises building system exchanges of energy and mass from the group of processors simple diffusion, microclimates, solar energy, mass storage, mass transportation in communication with building structures from the group of structures direct and concentrated light structures, building towers, staircases, solar chimneys, fixed and tracking reflective surfaces, beam steering adjustable focal points, hexagonal building design, in communication with light control technologies from the group of louvers, shutters, photochromic, thermochromic, electrochromic, photoelectrochromic technologies, retractable shade netting.

57. A method for extracting exergy within a dissipative structure in an engineered ecosystem, the method comprising:
providing thermal flux and reservoirs, conditioning an exergy carrier;
providing an exergy source comprising a plurality of reservoirs each with an assigned temperature range for storing thermal exergy whose temperature gradients are interconnected with heat sources and sinks;
wherein said heat sources and sinks provide thermal differentials and pressure differentials.

58. The method of claim 57, wherein a heat sink in an engineered ecosystem comprising prime mover from the group of thermoelectric power generator, thermoacoustic, Rankine, Carnot, communicating with said thermal flux heat energy.

59. The method of claim 57, wherein thermal reservoirs in an engineered ecosystem comprising thermal storage materials.

60. The method of claim 57, wherein heat sources and sinks in an engineered ecosystem supply steam wherein there is a first step where a desiccant is incrementally brought up to temperature using the temperature gradients of said thermal storage system, the second step wherein contained water changes phase into said steam, the third step wherein said steam released said thermal flux heat energy as volume change due to phase change thereby operating said prime mover.

61. The method of claim 57, wherein pressure differentials in an engineered ecosystem, comprising harnessing said thermal flux in a phase change when a liquid changes phase and expands into a gas, or the reciprocal, thereby operating said prime mover from the group of thermoelectric, turbine, Brayton cycle system.

62. The method of claim 57, wherein exergy source in an engineered ecosystem, powers a pressure swing adsorption (PSA) system, wherein said pressure swing adsorption (PSA) system separates and concentrates gas.

63. A system for extracting exergy within a dissipative structure in an engineered ecosystem, the system comprised of:
   thermal flux and reservoirs;
   conditioned exergy carriers;
   an exergy source comprised of a plurality of reservoirs each with an assigned temperature range for storage of thermal exergy whose temperature gradients are interconnected with heat sources and sinks;
   wherein said heat sources and sinks provide thermal differentials and pressure differentials from the group of heat, pressure, steam, or gas.

64. The system of claim 63, wherein in an engineered ecosystem a heat sink interconnected with said thermal flux heat energy, comprised of a prime mover from the group of thermoelectric power generator, thermoacoustic, Rankine, Carnot.

65. The system of claim 63, wherein thermal reservoirs in an engineered ecosystem, comprised of thermal storage materials from the group of sensible, latent.

66. The system of claim 63, wherein heat sources and sinks in an engineered ecosystem supply said steam interconnected to a desiccant wherein said desiccant's temperature is incrementally changed using the temperature gradients of said thermal storage system, said thermal flux heat energy changes the water's phase into said steam operating said prime mover.

67. The system of claim 63, wherein said heat, pressure in an engineered ecosystem, comprised of said thermal flux into a liquid phase change, gas expanded from said liquid, or the reciprocal, operating said prime mover from the group of thermo-acoustic prime mover, turbine, Brayton cycle system.

68. The system of claim 63, wherein exergy source an engineered ecosystem, interconnected to a pressure swing adsorption (PSA) system separates and concentrates said gas.

69. A method for optimizing exergy within a dissipative structure in an engineered ecosystem, the method comprising:
   providing a thermal management system comprising thermal flux and reservoirs, conditioning an exergy carrier;
   providing an atmospheric management system comprising, processing gas, driving of exergy carriers, filtration, segregation operations, conversion and concentration of structural exergy;
   controlling radiation and conduction processes, comprising and optimizing solar and artificial radiation usage;
   managing hydrological cycles;
   utilizing material cycles operation;
   providing an energy system prime mover;
   providing a supervisory management system; and
   utilizing a building system comprising managing and harnessing cascading flows of matter and energy providing homeostatic regulation utilizing exchanges of energy and mass over time.

70. A system for optimizing exergy within a dissipative structure in an engineered ecosystem, the system comprised of:
   a thermal management system comprised of thermal flux reservoirs in communication with exergy carriers;
   an atmospheric management system comprised from the group of gas processors, gas distributors, gas concentrators, exergy carrier movers, active agents, segregation and filters;
   a radiation processes controller, optimizing solar and artificial radiation usage of direct and concentrated light;
   a hydrological cycles management system;
   a material cycles operator comprised of gas, fluid, or solid handlers;
   an energy prime mover system;
   a supervisory management system; and
   a building system comprised of the homeostatic regulator of cascading flows of matter and energy, manager of energy and mass exchanges over time.

* * * * *